United States Patent
Tomikawa

(10) Patent No.: US 11,656,504 B2
(45) Date of Patent: May 23, 2023

(54) LIQUID CRYSTAL APPARATUS AND ELECTRONIC DEVICE

(71) Applicant: SEIKO EPSON CORPORATION, Tokyo (JP)

(72) Inventor: Naoki Tomikawa, Suwa-gun Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 200 days.

(21) Appl. No.: 16/872,463

(22) Filed: May 12, 2020

(65) Prior Publication Data

US 2020/0363667 A1   Nov. 19, 2020

(30) Foreign Application Priority Data

May 13, 2019   (JP) .............................. JP2019-090458

(51) Int. Cl.
   *G02F 1/1339*   (2006.01)
   *G02F 1/1337*   (2006.01)

(52) U.S. Cl.
   CPC ...... *G02F 1/1339* (2013.01); *G02F 1/133719* (2013.01)

(58) Field of Classification Search
   CPC ............. G02F 1/133337; G02F 1/1339; G02F 1/133719
   See application file for complete search history.

(56) References Cited

U.S. PATENT DOCUMENTS

| 10,948,783 | B2 * | 3/2021 | Yamada | G02F 1/133711 |
| 2005/0073618 | A1 * | 4/2005 | Hashimoto | G02F 1/1337 349/5 |
| 2005/0128367 | A1 * | 6/2005 | Hoke | G03F 7/70291 349/1 |
| 2007/0109236 | A1 | 5/2007 | Yamada et al. | |
| 2018/0267347 | A1 * | 9/2018 | Tanaka | G02F 1/133512 |

FOREIGN PATENT DOCUMENTS

| JP | S5057647 | 5/1975 |
| JP | 2002-014358 A | 1/2002 |
| JP | 2007-514204 A | 5/2007 |
| JP | 2007-139926 A | 6/2007 |
| JP | 2007-140008 A | 6/2007 |
| JP | 2013041130 | 2/2013 |

* cited by examiner

*Primary Examiner* — Edward J Glick
*Assistant Examiner* — David Y Chung
(74) *Attorney, Agent, or Firm* — JCIPRNET

(57) ABSTRACT

In a liquid crystal apparatus, a liquid crystal is provided in a cavity surrounded by a seal material between a first substrate and a second substrate, and the liquid crystal is aligned in a diagonal direction formed by corners 10*a*1, 10*a*3. Between a pixel area and the seal material, a first groove is formed along a side 20*a*6 from the corner 10*a*1 toward a corner 10*a*2. When a first pump is driven, the liquid crystal of the pixel area is drawn from a first end of the first groove on the corner 10*a*1 side, and the liquid crystal is ejected from a second end into the pixel area. As a result, a liquid crystal flow from the side of a side 20*a*7 toward the side of a side 20*a*9 occurs in the pixel area, and thus the liquid crystal can be smoothly circulated.

9 Claims, 19 Drawing Sheets

LIQUID CRYSTAL APPARATUS AND ELECTRONIC DEVICE

The present application is based on, and claims priority from JP Application Serial Number 2019-090458, filed May 13, 2019, the disclosure of which is hereby incorporated by reference herein in its entirety.

BACKGROUND

1. Technical Field

The present disclosure relates to a liquid crystal apparatus in which a groove configured to cause a liquid crystal to flow is provided between a pair of substrates, and an electronic device.

2. Related Art

A liquid crystal apparatus includes a pair of substrates, a seal material that bonds the pair of substrates to each other, and a liquid crystal held in a region surrounded by the seal material between the pair of substrates. In such a liquid crystal apparatus, when the liquid crystal is irradiated with light from a light source for a long period of time, decomposition or polymerization of the liquid crystal occurs, causing the liquid crystal to deteriorate. As a result, optical modulation characteristics of the liquid crystal apparatus change, and a reliability of an electronic device, such as a projection-type display apparatus, is reduced.

On the other hand, there has been proposed a technique of providing a circulation flow path that causes the liquid crystal to flow between an inner edge and an outer edge of the seal material, increasing a liquid crystal volume encapsulated between the pair of substrates, and causing the liquid crystal to connect through the circulation flow path, thereby extending the time until the entire liquid crystal deteriorates (refer to JP-A-2007-140008). Further, in JP-A-2007-1400008, there also has been proposed a technique of providing a circulation path with a forced circulation apparatus such as a piezoelectric element pump to promote a flow of liquid crystal in the circulation flow path.

Nevertheless, in the structure described in JP-A-2007-140008, sufficient consideration is not given to drawing the liquid crystal from a location where ionic impurities readily aggregate in the pixel area, a flow of liquid crystal flowing out from the circulation flow path to the pixel area, or a uniformity thereof, resulting in the problem that a concentration of ionic impurities in the liquid crystal of the pixel area cannot be kept low.

SUMMARY

To solve the above-described problems, according to an aspect of the present disclosure, a liquid crystal apparatus includes a pair of substrates, a seal material provided between the pair of substrates, a liquid crystal containing liquid crystal molecules that have negative dielectric anisotropy and are aligned in a diagonal direction in a pixel area on an inner side of the seal material, a first groove extending between the pixel area and the seal material and along a first side of one of the pair of substrates, and a first pump configured to draw the liquid crystal from one end side of the first groove and cause the liquid crystal to flow toward another end side of the first groove.

According to another aspect of the present disclosure, a liquid crystal apparatus includes a pair of substrates, a seal material provided between the pair of substrates, a liquid crystal containing liquid crystal molecules that have negative dielectric anisotropy and are aligned in a diagonal direction in a pixel area on an inner side of the seal material, a first groove extending between the pixel area and the seal material and along a first side of one of the pair of substrates, a liquid crystal discharge port provided in a position overlapping one of a region where the first groove extends and a counter region along a fourth side, which faces the first side of the one of the substrates, between the pixel area and the seal material, and a liquid crystal supplying port provided in a position overlapping the other one of the region where the first groove extends and the counter region.

The liquid crystal apparatus to which the present disclosure is applied may be used in various types of electronic devices such as a direct-view-type display apparatus and a projection-type display apparatus. When an electronic device is a projection-type display apparatus, the projection-type display apparatus includes a light source unit configured to emit light to be supplied to the liquid crystal apparatus, and a projection optical system configured to project light modulated by the liquid crystal apparatus.

DESCRIPTION OF EXEMPLARY EMBODIMENTS

Figure 1:
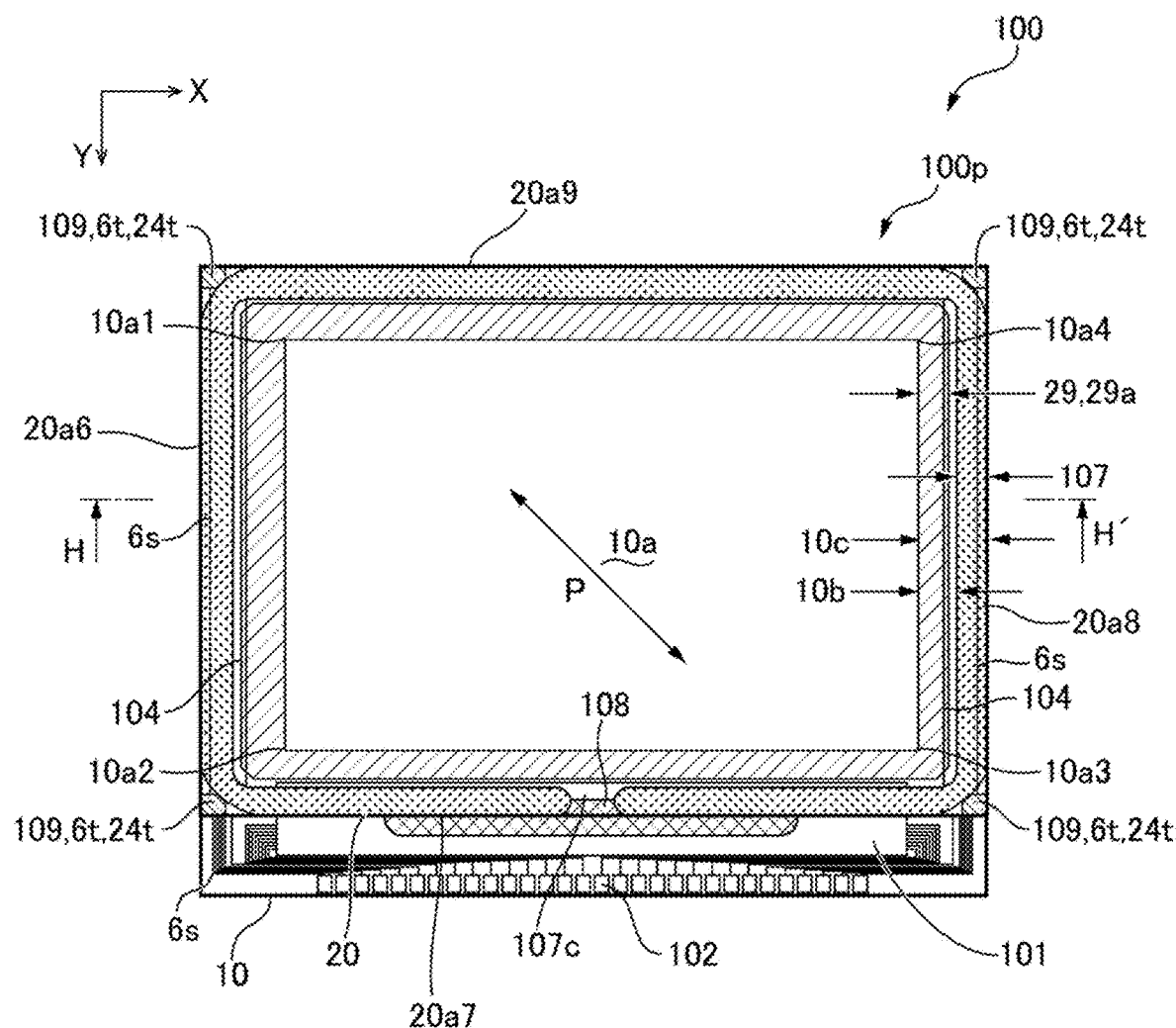
FIG. 1 is a plan view illustrating a configuration example of a liquid crystal apparatus according to exemplary embodiment 1 of the present disclosure.

Exemplary embodiments of the disclosure will be described below with reference to the drawings. Note that, in each of the drawings referenced in the following description, each layer, each member, and the like are illustrated at a different scale to illustrate each layer, each member, and the like in a recognizable size in the drawings. Further, when a layer formed in a first substrate 10 is described, an upper layer side or a surface side means a side opposite to a side of the first substrate 10 on which a substrate main body 10w is positioned (side on which a second substrate 20 and a liquid crystal 50 are positioned), and a lower layer side means a side of the first substrate 10 on which the substrate main body 10w is positioned. When a layer formed in the second substrate 20 is described, an upper layer side or a surface side means a side opposite to a side of the second substrate 20 on which a substrate main body 20w is positioned (side on which the first substrate 10 and the liquid crystal 50 are positioned), and a lower layer side means a side of the second substrate 20 on which the substrate main body 20w is positioned. Further, directions orthogonal to each other are referred to as an X direction and a Y direction, and directions in the X direction and the Y direction will be described as appropriate.

Exemplary Embodiment 1

Overall Configuration of Liquid Crystal Apparatus 100

Figure 2:
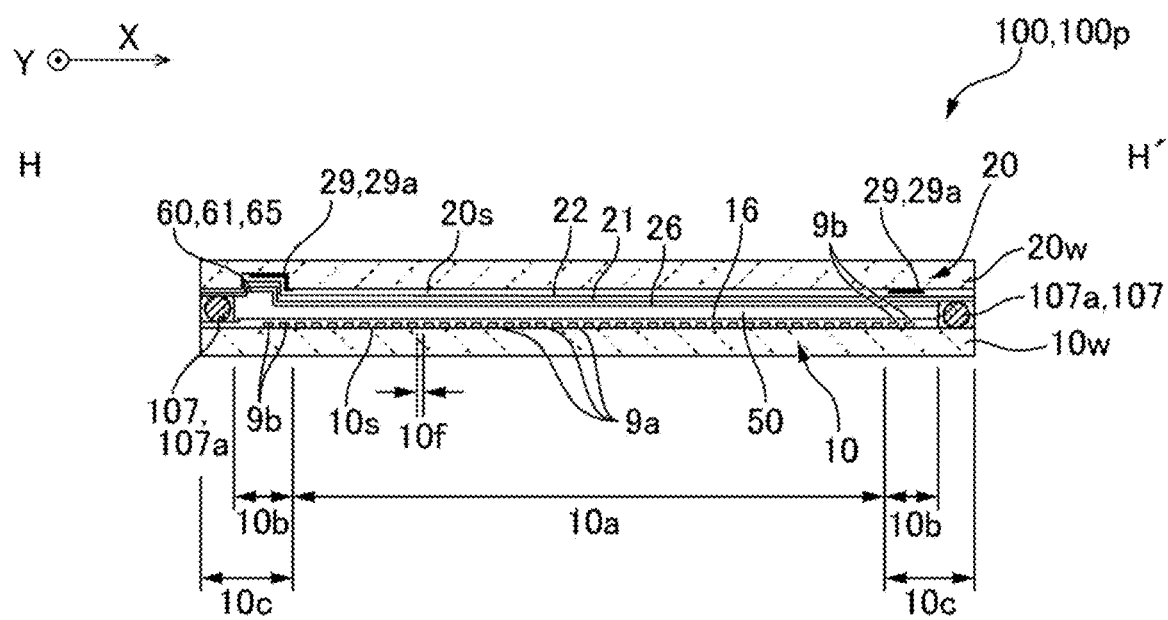
FIG. 2 is an H-H' cross-sectional view of the liquid crystal apparatus illustrated in FIG. 1.

FIG. 1 is a plan view illustrating a configuration example of a liquid crystal apparatus 100 according to exemplary embodiment 1 of the present disclosure. FIG. 2 is an H-H' cross-sectional view of the liquid crystal apparatus 100 illustrated in FIG. 1. The liquid crystal apparatus 100 illustrated in FIG. 1 and FIG. 2 includes a liquid crystal panel 100p. In the liquid crystal apparatus 100, a pair of substrates composed of the first substrate 10 (element substrate) and the second substrate 20 (counter substrate) are bonded together by a seal material 107 via a predetermined gap, and the seal material 107 is provided in a frame shape along an outer edge of the second substrate 20. The seal material 107 is an adhesive composed of a photocurable resin, a thermosetting resin, and the like, and includes a gap material 107a such as glass fiber or glass beads compounded to set a distance between the first substrate 10 and the second substrate 20 to a predetermined value. In the liquid crystal apparatus 100, the liquid crystal 50 is provided in a region surrounded by the seal material 107 between the first substrate 10 and the second substrate 20. In the seal material 107, a cut portion 107c used as a liquid crystal injection port is formed, and such a cut portion 107c is sealed by a sealing material 108 after a liquid crystal material is injected. Note that in a case where the liquid crystal material is injected and sealed by using a dropping method, the cut portion 107c is not formed.

In the liquid crystal apparatus 100, the first substrate 10 and the second substrate 20 each have a quadrangular shape and, on an inner side of the seal material 107, a pixel area 10a in which a plurality of pixels are disposed for displaying an image is provided as a quadrangular region. The seal material 107 is provided as a quadrangular frame-shaped region surrounding the pixel area 10a, and an outer side of the pixel area 10a is an outer peripheral region 10c having a quadrangular frame shape. In this exemplary embodiment, the pixel area 10a is provided as a rectangular area with long sides extending in the X direction. Further, the first substrate 10 and the second substrate 20 also have rectangular shapes with long sides extending in the X direction, similar to the pixel area 10a.

On a side on which the first substrate 10 protrudes from the second substrate 20 at the outer peripheral region 10c in the first substrate 10, a data line driving circuit 101 and a plurality of terminals 102 are formed along one side of the first substrate 10, and a scanning line driving circuit 104 is formed along each of other sides adjacent to the one side of the first substrate 10. The terminals 102 are provided on an outer peripheral side of the seal material 107. A flexible wiring substrate (not illustrated) is coupled to the terminals 102, and various potentials and various signals are input to the first substrate 10 via the flexible wiring substrate. In the exemplary embodiment, the data line driving circuit 101 and the scanning line driving circuit 104 partially overlap the seal material 107 in plan view.

The first substrate 10 includes the substrate main body 10w having light transmissivity, such as a quartz substrate or a glass substrate and, on the side of a first surface 10s of the first substrate 10 (substrate main body 10w) facing the second substrate 20, a plurality of pixel switching elements and a plurality of pixel electrodes 9a are formed in a matrix pattern in the pixel area 10a. The plurality of pixel electrodes 9a are each electrically coupled to a corresponding pixel switching element within the plurality of pixel switching elements. A first alignment film 16 is formed on the upper layer side of the pixel electrodes 9a.

The second substrate 20 includes the substrate main body 20w having light transmissivity, such as a quartz substrate or a glass substrate and, on the side of a first surface 20s of the second substrate 20 (substrate main body 20w) facing the first substrate 10, a common electrode 21 is formed. The common electrode 21 is formed entirely at the second substrate 20. On the side of the first surface 20s of the second substrate 20, a light-shielding layer 29 is formed on the lower layer side of the common electrode 21, and a second alignment film 26 is laminated on a surface of the common electrode 21 on the liquid crystal 50 side. An insulating film 22 having light transmissivity is formed between the light-shielding layer 29 and the common electrode 21. The light-shielding layer 29 is formed as a frame portion 29a extending along an outer peripheral edge of the pixel area 10a, and an outer edge of the pixel area 10a is defined by an inner edge of the frame portion 29a. The light-shielding layer 29 may be formed to include a black matrix portion (not illustrated) overlapping inter-pixel areas 10f, each sandwiched between the pixel electrodes 9a adjacent to each other. Further, a lens that overlaps, in plan view, the plurality of pixel electrodes 9a may be formed in the second substrate 20.

On the side of the first surface 10s of the first substrate 10, dummy pixel electrodes 9b formed simultaneously with the pixel electrodes 9a are formed in a peripheral area 10b having a quadrangular frame shape and sandwiched between the pixel area 10a and the seal material 107 in the outer peripheral region 10c. The dummy pixel electrodes, similar to the pixel electrodes 9a, 9b, may constitute dummy pixels to which pixel switching elements are coupled. In such a case as well, the dummy pixel electrodes 9b overlap the frame portion 29a and, when an image is displayed, are continuously established as black displays or the like and do not directly contribute to the display of the image. Accordingly, in the present disclosure, dummy pixels including dummy pixel electrodes 9b are not included in the pixel area 10a. Note that while, in FIG. 2, two rows of dummy pixel electrodes 9b are depicted per side, the dummy pixel electrodes 9b may be formed in one row or three rows or more.

In the liquid crystal apparatus 100, outside of the seal material 107, inter-substrate conduction electrode portions 24t composed of a portion of the common electrode 21 are formed at four corner sections on the side of the first surface 20s of the second substrate 20 and, on the side of the first surface 10s of the first substrate 10, inter-substrate conduction electrode portions 6t are formed at positions facing the four corner sections (inter-substrate conduction electrode portions 24t) of the second substrate 20. The inter-substrate conduction electrode portions 6t are conductively connected to a constant potential wiring line 6s to which a common potential Vcom is applied, and the constant potential wiring line 6s is conductively connected to, from among the plurality of terminals 102, a terminal 102a for common potential application. Inter-substrate conduction materials 109 including conductive particles are disposed between the inter-substrate conduction electrode portions 6t and the inter-substrate conduction electrode portions 24t, and the common electrode 21 of the second substrate 20 is electrically coupled to the first substrate 10 side via the inter-substrate conduction electrode portions 6t, the inter-substrate conduction materials 109, and the inter-substrate conduction electrode portions 24t. Thus, the common potential Vcom is applied to the common electrode 21 from the side of the first substrate 10.

The liquid crystal apparatus 100 of the exemplary embodiment is a transmissive type liquid crystal apparatus. Accordingly, the pixel electrodes 9a and the common electrode 21 are each formed of a transmissive conductive film, such as an indium tin oxide (ITO) film and an indium zinc oxide (IZO) film. In the transmissive type liquid crystal apparatus 100, for example, light incident from the side of the second substrate 20 is emitted from the first substrate 10, during which the light is modulated so that an image is displayed. Note that when the common electrode 21 is formed by a transmissive conductive film and the pixel electrodes 9a are reflective electrodes, the liquid crystal apparatus 100 is configured as a reflective type liquid crystal apparatus. In the reflective type liquid crystal apparatus 100, light incident from the side of the second substrate 20 is reflected at the pixel electrodes 9a of the first substrate 10 and is emitted from the second substrate 20 again, during which the light is modulated so that an image is displayed.

The liquid crystal apparatus 100 may be used as a color display apparatus of an electronic device such as a mobile computer or a mobile phone, and in this case, a color filter (not illustrated) is formed on the first substrate 10 or the second substrate 20. Further, the liquid crystal apparatus 100 may be used as a light valve of RGB in a projection-type display apparatus (liquid crystal projector) described later. In this case, for example, light of each color decomposed through a dichroic mirror for RGB color decomposition is incident as projection light on each of the liquid crystal apparatuses 100 for RGB and thus, a color filter is not formed.

Figure 3:
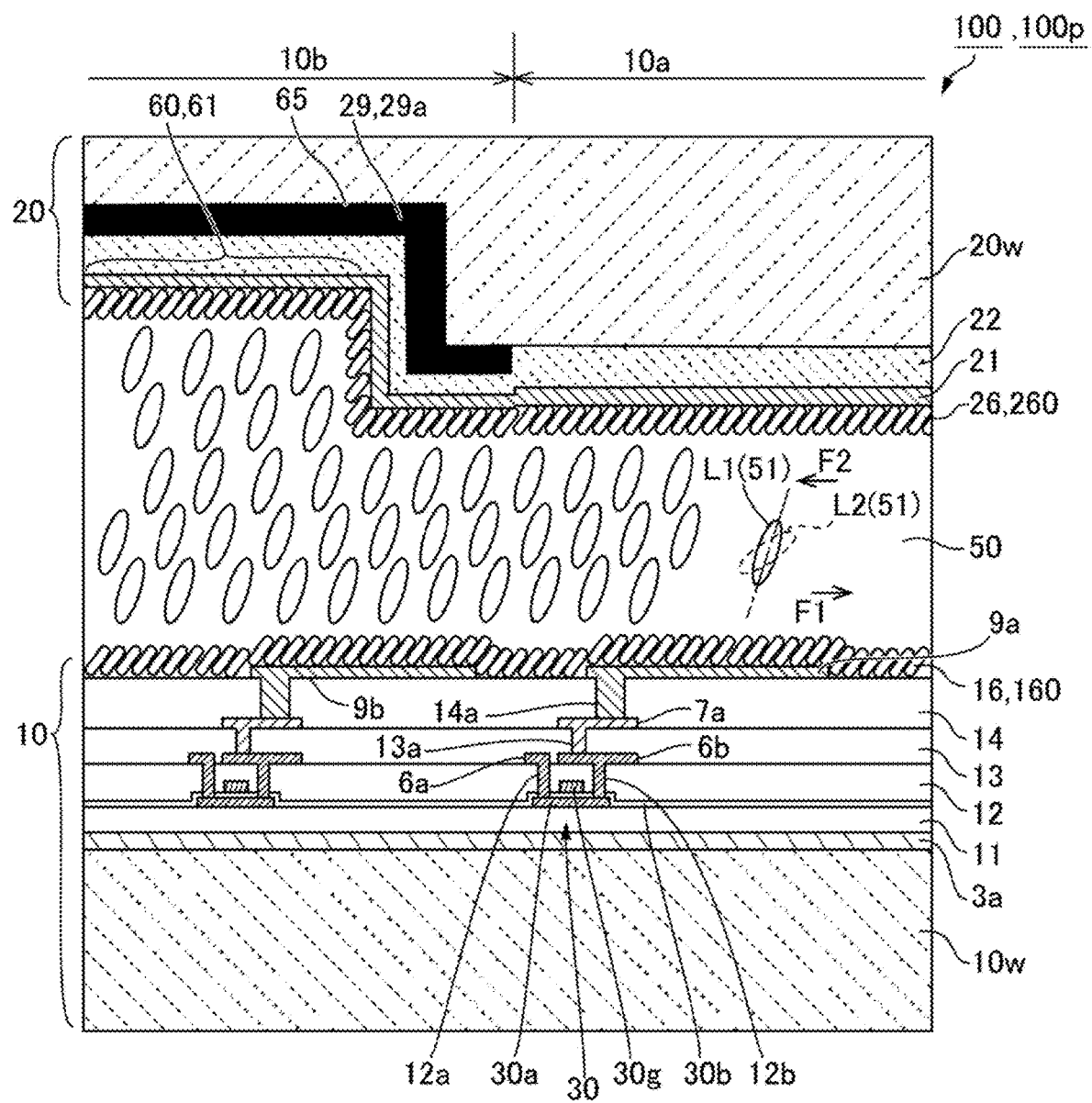
FIG. 3 is a cross-sectional view schematically illustrating a specific configuration example of pixels and the like of the liquid crystal apparatus illustrated in FIG. 1.

Specific Configuration of Pixel 100a FIG. 3 is a cross-sectional view schematically illustrating a specific configuration example of pixels and the like of the liquid crystal apparatus 100 illustrated in FIG. 1. As illustrated in FIG. 3, a scanning line 3a located on the lower layer side and composed of a conductive film such as a conductive polysilicon film, a metal silicide film, a metal film, or a metal compound film is formed on the first surface 10s side of the first substrate 10. In the exemplary embodiment, the scanning line 3a is composed of a light-shielding film of tungsten silicide (WSi) or the like. An insulating film 11 having light transmissivity is formed on the upper layer side of the scanning line 3a, and a pixel switching element 30 including a semiconductor layer 30a is formed on a surface side of such an insulating film 11. In the exemplary embodiment, the insulating film 11 is composed of a silicon oxide film or the like.

The pixel switching element 30 includes the semiconductor layer 30a, and a gate electrode 30g intersecting the semiconductor layer 30a, and includes a gate insulation layer 30b having light transmissivity between the semiconductor layer 30a and the gate electrode 30g. The semiconductor layer 30a includes a polysilicon film (polycrystalline silicon film) or the like. The gate insulation layer 30b has a two-layer structure including a gate insulation layer composed of a silicon oxide film obtained by thermally oxidizing the semiconductor layer 30a, and a second gate insulation layer composed of a silicon oxide film formed by a low-pressure chemical vapor deposition (CVD) method or the like. The gate electrode 30g is electrically coupled, via a contact hole (not illustrated) passing through the gate insulation layer 30b and the insulating film 11, to the scanning line 3a.

Interlayer insulating films 12, 13, 14 having light transmissivity and each composed of a silicon oxide film or the like are formed in this order on the upper layer side of the gate electrode 30g, and a retention capacitor (not illustrated) is constituted by utilizing spaces among the interlayer insulating films 12, 13, 14, and the like. A data line 6a and a drain electrode 6b are formed between the interlayer insulating film 12 and the interlayer insulating film 13, and a relay electrode 7a is formed between the interlayer insulating film 13 and the interlayer insulating film 14. The data line 6a is electrically coupled to a source area of the semiconductor layer 30a via a contact hole 12a passing through the interlayer insulating film 12 and the gate insulation layer 30b. The drain electrode 6b is electrically coupled to a drain area of the semiconductor layer 30a via a contact hole 12b passing through the interlayer insulating film 12 and the gate insulation layer 30b. The relay electrode 7a is electrically coupled to the drain electrode 6b via a contact hole 13a passing through the interlayer insulating film 13. A surface of the interlayer insulating film 14 is a flat face, and each pixel electrode 9a is formed on the surface side of the interlayer insulating film (face side on a side of the liquid crystal 50). The pixel electrode 9a is conductively connected to the relay electrode 7a via a contact hole 14a passing through the interlayer insulating film 14. Accordingly, the pixel electrode 9a is electrically coupled to a drain area of the pixel switching element 30 via the relay electrode 7a and the drain electrode 6b.

The first alignment film 16 and the second alignment film 26 are each an inorganic alignment film composed of an obliquely deposited film of a silicon oxide film ($SiO_x$ ($x \leq 2$)), a titanium oxide film ($TiO_2$), a magnesium oxide film (MgO), or an aluminum oxide film ($Al_2O_3$ or the like). Accordingly, in the first alignment film 16 and the second alignment film 26, columnar structures 160, 260 (columns) are obliquely inclined from the normal direction relative to the first surfaces 10s, 20s of the first substrate 10 and the second substrate 20. Alignment regulating forces of the first alignment film 16 and the second alignment film 26 are anti-parallel. Thus, the first alignment film 16 and the second alignment film 26 cause major axes of nematic liquid crystal molecules (liquid crystal molecules 51), which have negative dielectric anisotropy used in the liquid crystal 50, to be aligned in an obliquely inclined manner relative to the first substrate 10 and the second substrate 20, thereby causing the liquid crystal molecules 51 to be pre-tilted, as indicated by a solid line L1.

In the exemplary embodiment, the first alignment film 16 or the second alignment film 26 aligns the liquid crystal molecules 51 in a direction that forms an angle of 45 degrees or 135 degrees relative to four sides that define the outer edge of the pixel area 10a, as indicated by an arrow P in FIG. 1, for example. Accordingly, the liquid crystal molecules 51 are aligned in a diagonal direction formed by, from among four corners 10a1, 10a2, 10a3, 10a4 of the pixel area 10a, the corner 10a1 (first corner) and the corner 10a3 (second corner). In this way, the liquid crystal apparatus 100 is configured as a liquid crystal apparatus of a normally black vertical alignment (VA) mode. Note that, of the liquid crystal molecules 51, the liquid crystal molecules 51 positioned near the first substrate 10 and the second substrate 20 are each held by the first alignment film 16 or the second alignment film 26. In the exemplary embodiment, from among a plurality of sides 20a6, 20a7, 20a8, and 20a9 that define an outer edge of one substrate (for example, the second substrate 20) of the pair of substrates, the sides 20a6, 20a8 correspond to short sides, and the sides 20a7, 20a9 correspond to long sides.

Configuration of First Groove 61

Figure 4:
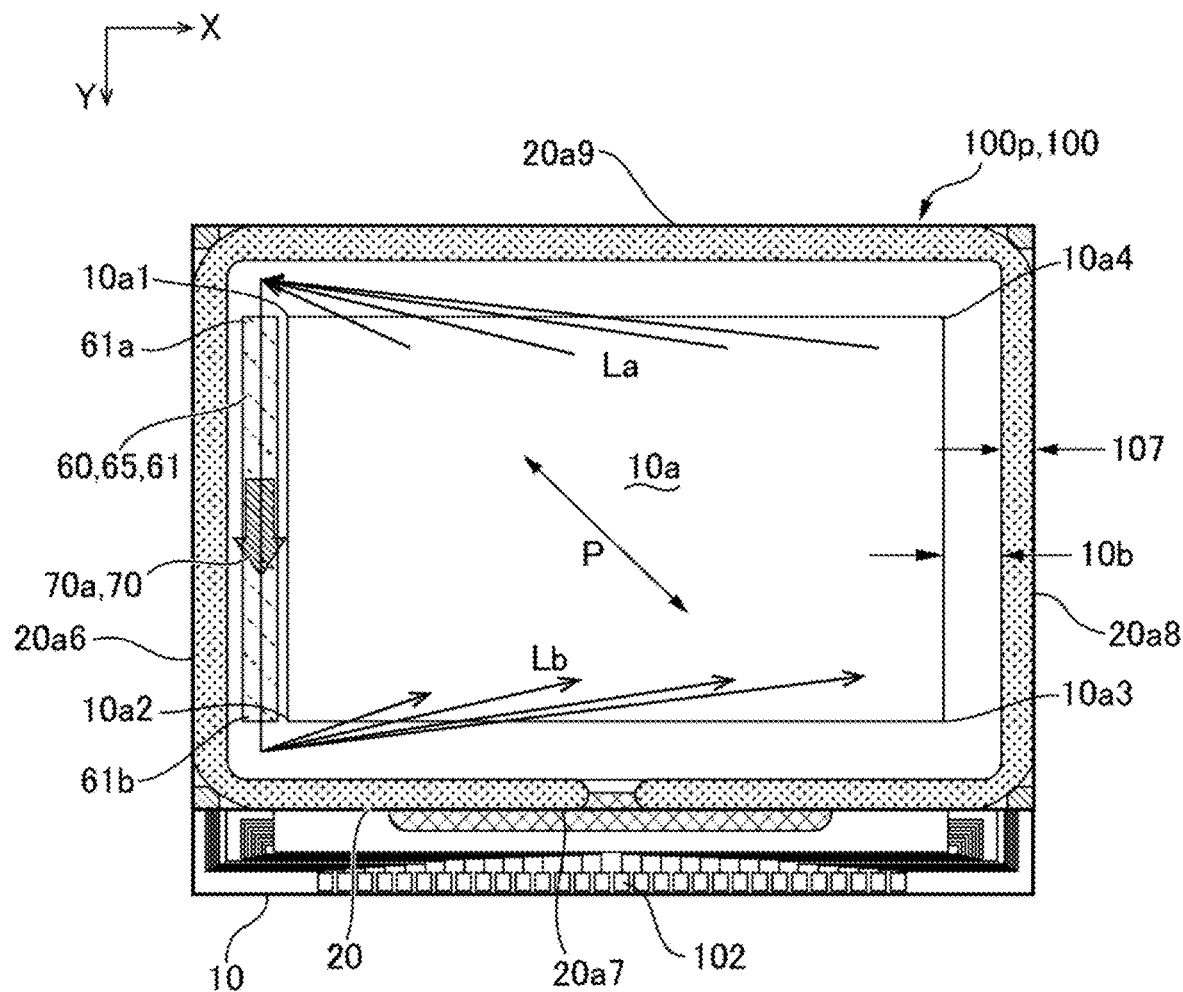
FIG. 4 is an explanatory view schematically illustrating a planar configuration of a flow path provided to the liquid crystal apparatus illustrated in FIG. 1.

FIG. 4 is an explanatory view schematically illustrating a planar configuration of a flow path 60 provided to the liquid crystal apparatus 100 illustrated in FIG. 1. In this exemplary embodiment, the relationship between the four sides 20a6, 20a7, 20a8, 20a9 of the second substrate 20 and a first side, a second side, a third side, and a fourth side of the present disclosure and the like are as follows.

Side 20a6 (short side)="First side"
Side 20a7 (long side)="Third side"
Side 20a8 (short side)="Fourth side"
Side 20a9 (long side)="Second side"
Corner 10a1="First corner"
Corner 10a3="Second corner"

As illustrated in FIG. 4, in the liquid crystal apparatus 100 of the exemplary embodiment, the flow path 60 of the liquid crystal 50 is formed between the pixel area 10a and the seal material 107, and the flow path 60 includes a first groove 61 extending along the side 20a6 (first side) extending in the Y direction from a side of the pixel area 10a on which the corner 10a1 (first corner) is positioned. Accordingly, a gap between the pair of substrates (the first substrate 10 and the second substrate 20) in the flow path 60 is wider than a gap between the pair of substrates in the pixel area 10a. In the exemplary embodiment, the first groove 61 extends from the corner 10a1 to the corner 10a2 along the side 20a6.

The first groove 61 is formed by a process such as etching performed on at least one of the substrate main body 10w of the first substrate 10 and the substrate main body 20w of the second substrate 20. In the exemplary embodiment, the first groove 61 is composed of a groove 65 formed by the etching of the substrate main body 20w of the second substrate 20. Accordingly, the light-shielding layer 29, the insulating film 22, the common electrode 21, and the second alignment film 26 are formed along a wall surface of the first groove 61. While, in FIG. 2 and FIG. 3, the first groove 61 (groove 65) is represented by a cross-sectional quadrangular shape, the first groove 61 may be formed into a cross-sectional V-shape.

In the exemplary embodiment, the gap between the first substrate 10 and the second substrate 20 in the pixel area 10a is about several μm while the gap between the first substrate 10 and the second substrate 20 in the first groove 61 (flow path 60) is increased to about several tens of μm. Accordingly, a thickness of the liquid crystal 50 in the first groove 61 is greater than a thickness of the liquid crystal 50 in the pixel area 10a. Therefore, a volume of the flow path 60 can be increased and a flow path resistance can be reduced.

Configuration of First Pump 70a

Figure 5:
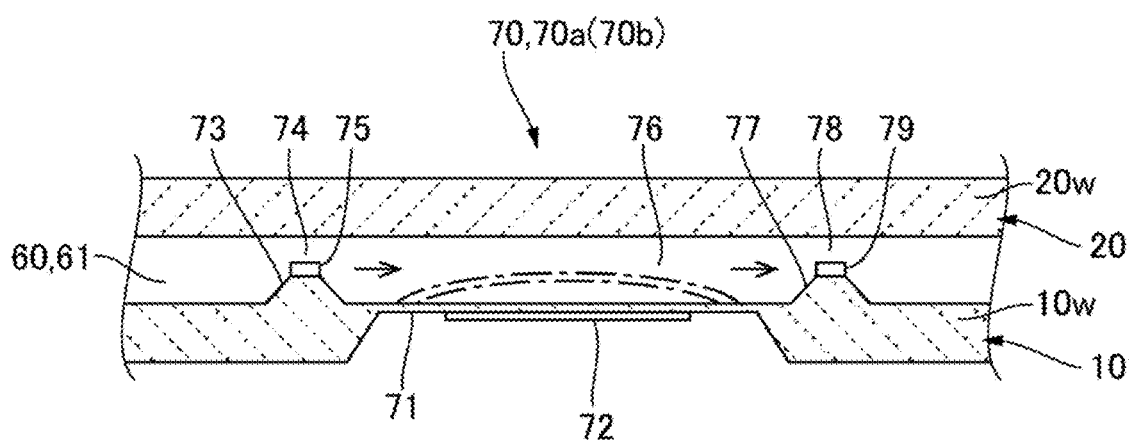
FIG. 5 is a cross-sectional view of a first pump illustrated in FIG. 4.

FIG. 5 is a cross-sectional view of a first pump 70a illustrated in FIG. 4. As illustrated in FIG. 4, the liquid crystal apparatus 100 of the exemplary embodiment is provided with the first pump 70a configured to cause the liquid crystal 50 of the first groove 61 to flow, and the first pump 70a causes the liquid crystal 50 in the first groove 61 to flow in the Y direction from a first end 61a of the first groove 61 where the corner 10a1 is positioned toward a second end 61b where the corner 10a2 is positioned. In the exemplary embodiment, the first pump 70a is provided in a region overlapping the first groove 61 between the first substrate 10 and the second substrate 20. More specifically, as illustrated in FIG. 5, the first pump 70a is, for example, a piezoelectric element pump 70 provided with a piezoelectric element 72, and the piezoelectric element 72 is mounted on an outer surface of a vibrating plate 71 in which a portion of the first substrate 10 corresponding to the flow path 60 is made thinner. The piezoelectric element 72 is formed by sandwiching a piezoelectric material composed of lead zirconate titanate (PZT) or the like between a pair of electrodes. A protrusion 73 is formed upstream of the vibrating plate 71 in the flow path 60, and a drawing port 74 of the liquid crystal 50 is formed between the protrusion 73 and the first substrate 10. A protrusion 77 is also formed downstream of the vibrating plate 71 in the flow path 60, and an area between the protrusion 77 and the first substrate 10 is established as an ejection port 78 of the liquid crystal 50. Therefore, a pressure chamber 76 in which the vibrating plate 71 serves as a partition is formed between the drawing port 74 and the ejection port 78. A conductive layer 75 is formed on a tip end of the protrusion 73, and a conductive layer 79 is also formed on a tip end of the protrusion 77.

In the first pump 70a thus configured, when a voltage is applied to the piezoelectric element 72, the piezoelectric element 72 expands and deforms. As a result, as indicated by the dot-dash line in FIG. 5, the vibrating plate 71 bends and deforms toward the flow path 60, and a pressure in the pressure chamber 76 increases. Further, the conductive layer 79 of the ejection port 78 is energized at the same time as the piezoelectric element 72 is energized. Then, Joule heat is generated due to an internal resistance of the conductive layer 79, and a periphery of the ejection port 78 is heated. As a result, a viscosity of the liquid crystal at the ejection port 78 is lower than that at the drawing port 74, and thus a flow resistance of the liquid crystal at the ejection port 78 is lower than that at the drawing port 74. Accordingly, the liquid crystal in the pressure chamber 76 flows out through the ejection port 78.

Next, when the application of voltage to the piezoelectric element 72 is stopped, the piezoelectric element 72 returns to its original shape, as indicated by the solid line in FIG. 5. As a result, the vibrating plate 71 also returns to its original shape, and the pressure in the pressure chamber 76 decreases. Further, the conductive layer 75 of the drawing port 74 is energized at the same time as the energization of the piezoelectric element 72 is stopped, thereby heating a periphery of the drawing port 74. As a result, the viscosity of the liquid crystal at the drawing port 74 is lower than that at the ejection port 78, and thus the flow resistance of the liquid crystal at the drawing port 74 is lower than that at the ejection port 78. Accordingly, the liquid crystal flows into the pressure chamber 76 through the drawing port 74.

Note that, even when a reverse voltage is applied to the piezoelectric element 72 instead of stopping the application of voltage to the piezoelectric element 72, the operation is substantially the same as described above. Further, instead of heating the drawing port 74 or the ejection port 78 to change the viscosity of the liquid crystal 50, the liquid crystal 50 may be driven to change in viscosity at the drawing port 74 or the ejection port 78. For example, when an electric field is applied between the conductive layers 75, 79 and the common electrode 21, the liquid crystal 50 is aligned in accordance with the electric field and the viscosity of the liquid crystal changes, and thus such a change in viscosity may be utilized to draw the liquid crystal 50 at the drawing port 74 and eject the liquid crystal 50 at the ejection port 78. Further, as the first pump 70a, a pump that uses a surface acoustic wave element may be used instead of the piezoelectric element 72.

Main Effects of Exemplary Embodiment

In the liquid crystal apparatus 100 of the exemplary embodiment, the first groove 61 is provided in the peripheral area 10b sandwiched between the pixel area 10a and the seal material 107, and thus it is possible to increase a filled amount of the liquid crystal 50. Accordingly, the time until the entire liquid crystal 50 deteriorates can be extended.

Further, when the liquid crystal apparatus 100 is driven, in the liquid crystal 50, the liquid crystal molecules 51 switch posture as indicated by the solid line L1 and a dotted line L2 in FIG. 3. Accordingly, in the liquid crystal 50, the flow of the liquid crystal 50 occurs near the first substrate 10 and near the second substrate 20 as indicated by arrows F1, F2. Therefore, ionic impurities that enter the liquid crystal 50 during assembly of the liquid crystal apparatus 100 and ionic impurities produced when the liquid crystal 50 is decomposed by strong light from the light source tend to aggregate at the corners 10a1, 10a3 of the pixel area 10a. In such a case as well, when the liquid crystal 50 in the first groove 61 is caused to flow by the first pump 70a from the first end 61a of the first groove 61 where the corner 10a1 is positioned toward the second end 61b where the corner 10a2 is positioned, the liquid crystal 50 near the corner 10a1 of the pixel area 10a is drawn into the first groove 61 at the first end 61a while the liquid crystal 50 is ejected from the second end 61b of the first groove 61 near the corner 10a2. At this time, in the pixel area 10a, the liquid crystal 50 is drawn into the first groove 61 from a region along the side 20a9 adjacent to the side 20a6 as indicated by an arrow La in FIG. 4 while the liquid crystal 50 is ejected into the pixel area 10a from a region along the side 20a7 adjacent to the side 20a6 as indicated by an arrow Lb in FIG. 4. Accordingly, in the pixel area 10a, a flow of the liquid crystal 50 in one direction from the side of the side 20a7 toward the side of the side 20a9 occurs. As a result, the liquid crystal 50 ejected from the first groove 61 can be smoothly distributed across the pixel area 10a, and thus a concentration of ionic impurities in the liquid crystal 50 of the pixel area 10a is easily kept at a relatively low level. Therefore, according to the exemplary embodiment, a period in which an image can be displayed in a state of high quality can be extended.

Further, because the first groove 61 extends along the side 20a6 (first side) that is a short side, a distance from the side 20a7 to the side 20a9 is short. Accordingly, in the pixel area 10a, the flow of the liquid crystal 50 in one direction from the side 20a7 toward the side 20a9 smoothly occurs. Accordingly, the liquid crystal 50 ejected from the first groove 61 can be smoothly distributed across the pixel area 10a, and thus the concentration of ionic impurities in the liquid crystal 50 of the pixel area 10a is easily kept at a relatively low level. Further, the first end 61a of the first groove 61 draws the liquid crystal 50 from the one corner 10a1 of the corners 10a1, 10a3 of the pixel area 10a where the ionic impurities tend to aggregate. Therefore, the liquid crystal 50 in the region of the pixel area 10a where the ionic impurities tend to become high in concentration is drawn into the first groove 61, and thus the concentration of ionic impurities in the liquid crystal 50 of the pixel area 10a is easily kept at a relatively low level.

Further, due to the difference between the thickness of the liquid crystal 50 in the first groove 61 and the thickness of the liquid crystal 50 in the pixel area 10a, the flow of the liquid crystal 50 in the first groove 61 is less likely to leak into the pixel area 10a, making high quality display possible.

Note that the driving of the first pump 70a may be performed continuously or may be performed intermittently during use of an electronic device such as a projection-type display apparatus described later. Further, the driving may be performed for just a certain period during startup or shutdown of the electronic device.

Second Exemplary Embodiment

Figure 6:
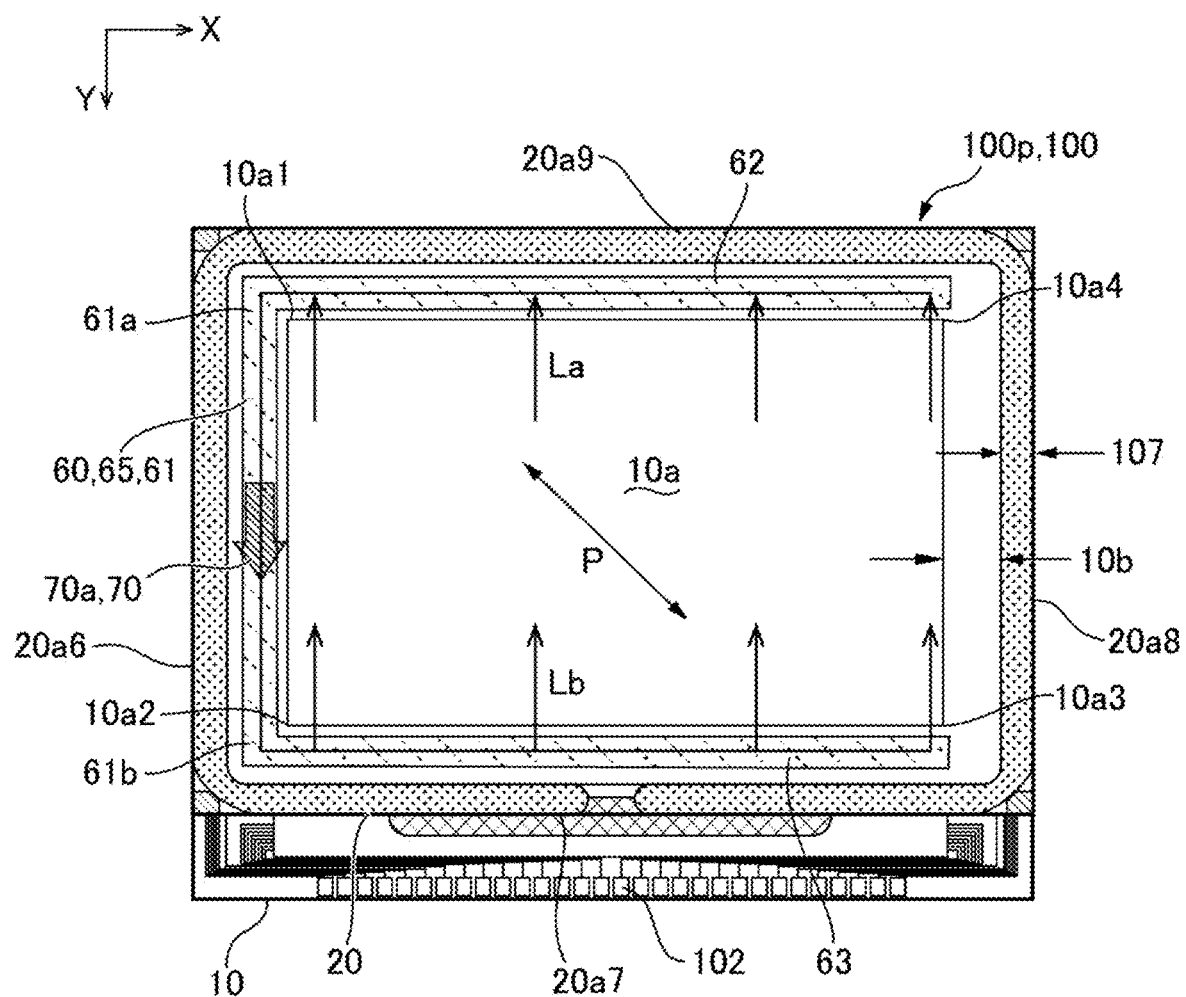
FIG. 6 is an explanatory view of the liquid crystal apparatus according to exemplary embodiment 2 according to the present disclosure.

FIG. 6 is an explanatory view of the liquid crystal apparatus 100 according to exemplary embodiment 2 of the present disclosure, and schematically illustrates a planar configuration of the flow path 60 provided to the liquid crystal apparatus 100. Note that, since the basic configurations of this exemplary embodiment and an exemplary embodiment described later are the same as the basic configuration of exemplary embodiment 1, constituent elements common to exemplary embodiment 1 are assigned the same reference symbols and description thereof will be omitted. In this exemplary embodiment, similar to exemplary embodiment 1, the relationship between the four sides 20a6, 20a7, 20a8, 20a9 of the second substrate 20 and the first side, the second side, the third side, and the fourth side of the present disclosure and the like are as follows.
Side 20a6 (short side)="First side"
Side 20a7 (long side)="Third side"
Side 20a8 (short side)="Fourth side"
Side 20a9 (long side)="Second side"
Corner 10a1="First corner"
Corner 10a3="Second corner"

As illustrated in FIG. 6, in this exemplary embodiment as well, similar to exemplary embodiment 1, the flow path 60 including the first groove 61 extending along the side 20a6 (first side) extending in the Y direction from the side of the pixel area 10a on which the corner 10a1 (first corner) is positioned is formed between the pixel area 10a and the seal material 107. In the exemplary embodiment, the flow path 60 further includes a second groove 62 extending between the pixel area 10a and the seal material 107 along 20a9 (second side) adjacent to the first side 20a6, and a third groove 63 extending between the pixel area 10a and the seal material 107 along the side 20a7 (third side) facing the side 20a9 (second side). The second groove 62 connects with the first end 61a of the first groove 61, and extends along the entire portion of the pixel area 10a along the side 20a7. The third groove 63 connects with the second end 61b of the first groove 61, and extends along the entire portion of the pixel area 10a along the side 20a9. Similar to exemplary embodiment 1, the first groove 61, the second groove 62, and the third groove 63 are each constituted by the groove 65 formed in the substrate main body 20w of the second substrate 20.

Further, the liquid crystal apparatus 100 is provided with the first pump 70a configured to cause the liquid crystal 50 of the first groove 61 to flow, and the first pump 70a causes the liquid crystal 50 in the first groove 61 to flow in the Y direction from the first end 61a of the first groove 61 where the corner 10a1 is positioned toward the second end 61b where the corner 10a2 is positioned. In the exemplary embodiment, the first pump 70a is the piezoelectric element pump 70 provided between the first substrate 10 and the second substrate 20. The rest of the configuration is the same as that of exemplary embodiment 1.

In the exemplary embodiment, when the liquid crystal 50 in the first groove 61 is caused to flow by the first pump 70a from the first end 61a of the first groove 61 where the corner 10a1 is positioned toward the second end 61b where the corner 10a2 is positioned, the liquid crystal 50 of the pixel area 10a is drawn into the first groove 61 from a region near the corner 10a1 and along the side 20a9 in the pixel area 10a via the second groove 62 as indicated by the arrow La in FIG. 6. Accordingly, the liquid crystal 50 flows from the pixel area 10a to the second groove 62 in a direction intersecting an extending direction of the second groove 62. Further, as indicated by the arrow Lb in FIG. 6, from the first groove 61, the liquid crystal 50 is ejected from the region along the side 20a7 into the pixel area 10a via the third groove 63. Accordingly, the liquid crystal 50 flows from the third groove 63 to the pixel area 10a in a direction intersecting an extending direction of the third groove 63. Therefore, the liquid crystal 50 flows at a uniform flow rate in a direction orthogonal to the extending directions of the second groove 62 and the third groove 63 and, in the pixel area 10a, the flow of the liquid crystal 50 in one direction from the side of the side 20a7 toward the side of the side 20a9 occurs. As a result, the liquid crystal 50 ejected from the first groove 61 can be smoothly distributed across the pixel area 10a, and thus effects similar to those of exemplary embodiment 1, such as a concentration of ionic impurities in the liquid crystal 50 of the pixel area 10a being easily kept at a relatively low level, are achieved.

Exemplary Embodiment 3

Figure 7:
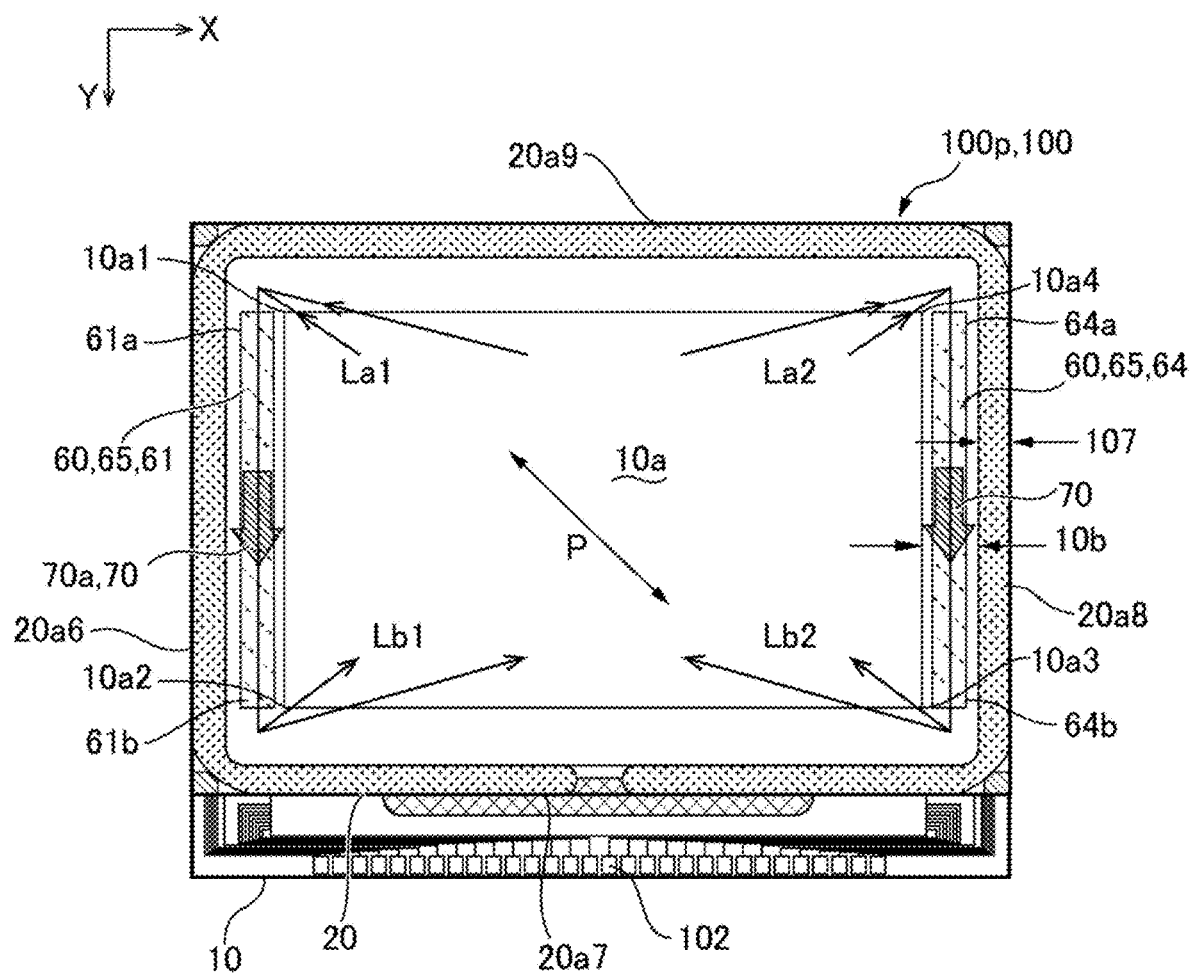
FIG. 7 is an explanatory view of the liquid crystal apparatus according to exemplary embodiment 3 of the present disclosure.

FIG. 7 is an explanatory view of the liquid crystal apparatus 100 according to exemplary embodiment 3 of the present disclosure, and schematically illustrates a planar configuration of the flow path 60 provided to the liquid crystal apparatus 100. In this exemplary embodiment, similar to exemplary embodiment 1, the relationship between the four sides 20a6, 20a7, 20a8, 20a9 and the first side, the second side, the third side, and the fourth side of the present disclosure and the like are as follows.
Side 20a6 (short side)="First side"
Side 20a7 (long side)="Third side"
Side 20a8 (short side)="Fourth side"
Side 20a9 (long side)="Second side"
Corner 10a1="First corner"
Corner 10a3="Second corner"

As illustrated in FIG. 7, in this exemplary embodiment as well, similar to exemplary embodiment 1, the flow path 60 including the first groove 61 extending along the side 20a6 (first side) extending in the Y direction from the side of the pixel area 10a on which the corner 10a1 (first corner) is positioned is formed between the pixel area 10a and the seal material 107. In the exemplary embodiment, the flow path 60 further includes a fourth groove 64 extending along the side 20a8 (fourth side) facing the side 20a6 between the pixel area 10a and the seal material 107. Here, the first groove 61 and the fourth groove 64 are not connected. Similar to exemplary embodiment 1, the first groove 61 and the fourth groove 64 are each constituted by the groove 65 formed in the substrate main body 20w of the second substrate 20.

Further, the liquid crystal apparatus 100 is provided with the first pump 70a configured to cause the liquid crystal 50 of the first groove 61 to flow, and the first pump 70a causes the liquid crystal 50 in the first groove 61 to flow in the Y direction from the first end 61a of the first groove 61 where the corner 10a1 is positioned toward the second end 61b where the corner 10a2 is positioned. Further, the liquid crystal apparatus 100 is provided with a second pump 70b configured to cause the liquid crystal 50 of the fourth groove 64 to flow, and the second pump 70b causes the liquid crystal 50 in the fourth groove 64 to flow in the same direction (Y direction) as caused by the first pump 70a. That is, the second pump 70b causes the liquid crystal 50 in the fourth groove 64 to flow in the Y direction from a first end 64a of the fourth groove 64 where the corner 10a4 is positioned toward a second end 64b where the corner 10a3 is positioned. In the exemplary embodiment, the first pump 70a and the second pump 70b are each the piezoelectric element pump 70 provided in a region overlapping the first groove 61 and the fourth groove 64 between the first substrate 10 and the second substrate 20. The rest of the configuration is the same as that of exemplary embodiment 1.

In the exemplary embodiment, when the liquid crystal 50 in the first groove 61 is caused to flow by the first pump 70a from the first end 61a of the first groove 61 where the corner 10a1 is positioned toward the second end 61b where the corner 10a2 is positioned, the liquid crystal 50 of the pixel area 10a is drawn into the first groove 61 from a region near the corner 10a1 as indicated by an arrow La1 in FIG. 7 while the liquid crystal 50 is ejected from a region near the corner 10a2 into the pixel area 10a as indicated by an arrow Lb1 in FIG. 7. Further, when the liquid crystal 50 in the fourth groove 64 is caused to flow by the second pump 70b from the first end 64a of the fourth groove 64 where the corner 10a4 is positioned toward the second end 64b where the corner 10a3 is positioned, the liquid crystal 50 of the pixel area 10a is drawn into the fourth groove 64 from a region near the corner 10a4 as indicated by an arrow La2 while the liquid crystal 50 is ejected from a region near the corner 10a3 into the pixel area 10a as indicated by an arrow Lb2 in FIG. 7. Accordingly, in the pixel area 10a, the flow of the liquid crystal 50 in one direction from the side of the side 20a7 toward the side of the side 20a9 occurs. As a result, the liquid crystal 50 ejected from the first groove 61 and the fourth groove 64 can be smoothly distributed across the pixel area 10a, and thus effects similar to those of exemplary embodiment 1, such as a concentration of ionic impurities in the liquid crystal 50 in the pixel area 10*a* being easily kept at a relatively low level, are achieved.

Exemplary Embodiment 4

Figure 8:
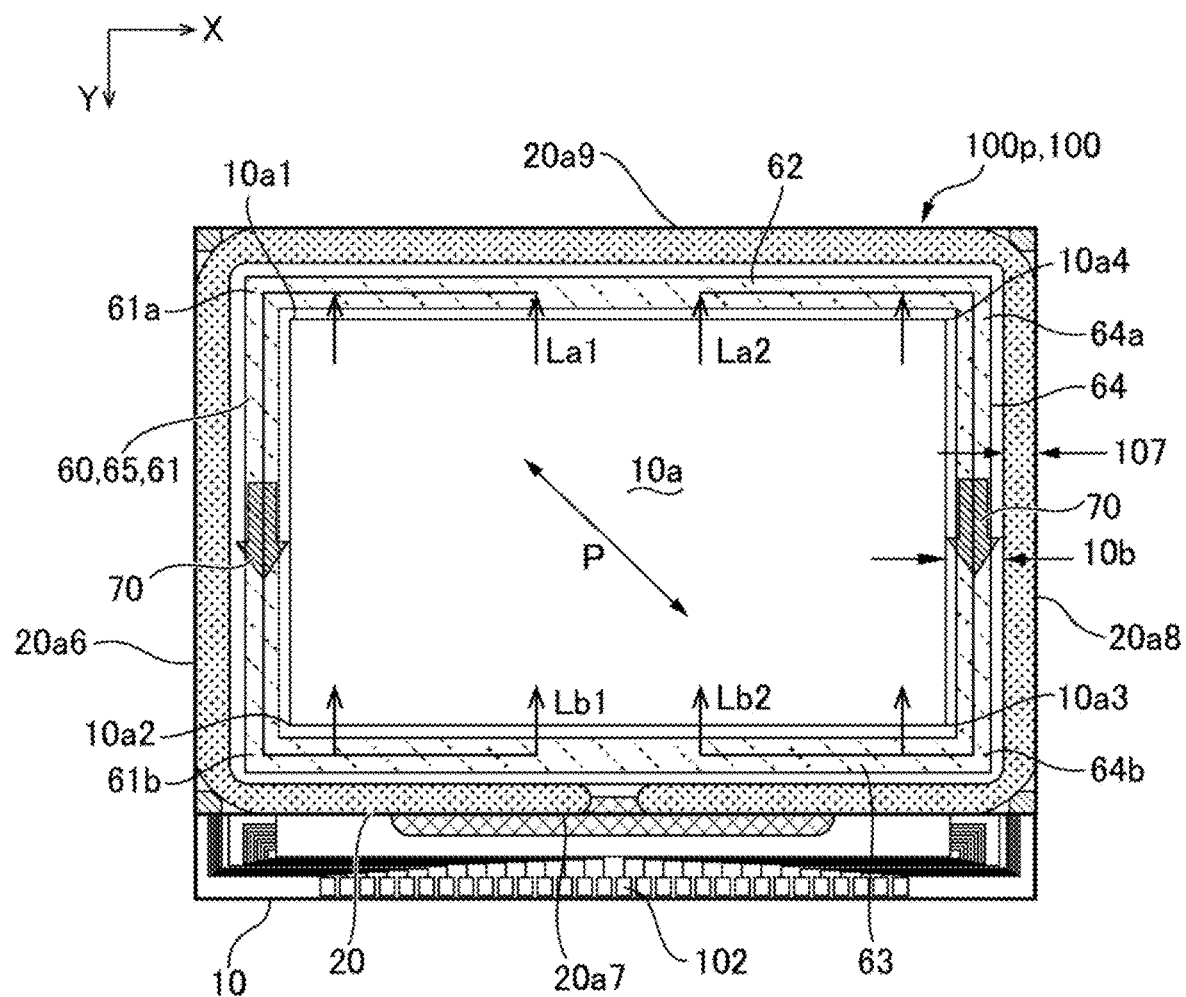
FIG. 8 is an explanatory view of the liquid crystal apparatus according to exemplary embodiment 4 of the present disclosure.

FIG. 8 is an explanatory view of the liquid crystal apparatus 100 according to exemplary embodiment 4 of the present disclosure, and schematically illustrates a planar configuration of the flow path 60 provided to the liquid crystal apparatus 100. In this exemplary embodiment, similar to exemplary embodiment 1, the relationship between the four sides 20*a*6, 20*a*7, 20*a*8, 20*a*9 and the first side, the second side, the third side, and the fourth side of the present disclosure and the like are as follows.

Side 20*a*6 (short side)="First side"
Side 20*a*7 (long side)="Third side"
Side 20*a*8 (short side)="Fourth side"
Side 20*a*9 (long side)="Second side"
Corner 10*a*1="First corner"
Corner 10*a*3="Second corner"

As illustrated in FIG. 6, in this exemplary embodiment as well, similar to exemplary embodiment 1, the flow path 60 including the first groove 61 extending along the side 20*a*6 (first side) extending in the Y direction from the side of the pixel area 10*a* on which the corner 10*a*1 (first corner) is positioned is formed between the pixel area 10*a* and the seal material 107. Further, similar to exemplary embodiment 3, the flow path 60 further includes the fourth groove 64 extending along the side 20*a*8 (fourth side) facing the side 20*a*6 between the pixel area 10*a* and the seal material 107. In the exemplary embodiment, the flow path 60 further includes the second groove 62 extending between the pixel area 10*a* and the seal material 107 along 20*a*9 (second side) adjacent to the first side 20*a*6, and the third groove 63 extending between the pixel area 10*a* and the seal material 107 along the side 20*a*7 (third side) facing the side 20*a*9 (second side). The second groove 62 connects with the first end 61*a* of the first grooves 61 and the first end 64*a* of the fourth groove 64, and the third groove 63 connects with the second end 61*b* of the first groove 61 and the second end 64*b* of the fourth groove 64. Similar to exemplary embodiment 1, the first groove 61, the second groove 62, and the third groove 63, and the fourth groove 64 are each constituted by the groove 65 formed in the substrate main body 20*w* of the second substrate 20.

Further, the liquid crystal apparatus 100 is provided with the first pump 70*a* configured to cause the liquid crystal 50 of the first groove 61 to flow, and the first pump 70*a* causes the liquid crystal 50 in the first groove 61 to flow in the Y direction from the first end 61*a* of the first groove 61 where the corner 10*a*1 is positioned toward the second end 61*b* where the corner 10*a*2 is positioned. Further, the liquid crystal apparatus 100 is provided with the second pump 70*b* configured to cause the liquid crystal 50 of the fourth groove 64 to flow, and the second pump 70*b* causes the liquid crystal 50 in the fourth groove 64 to flow in the same direction (Y direction) as caused by the first pump 70*a*. The first pump 70*a* and the second pump 70*b* are each the piezoelectric element pump 70 provided between the first substrate 10 and the second substrate 20. The rest of the configuration is the same as that of exemplary embodiment 1.

In the exemplary embodiment, when the liquid crystal 50 in the first groove 61 is caused to flow by the first pump 70*a* from the first end 61*a* of the first groove 61 where the corner 10*a*1 is positioned toward the second end 61*b* where the corner 10*a*2 is positioned, the liquid crystal 50 of the pixel area 10*a* is drawn into the first groove 61 from a region near the corner 10*a*1 and along the side 20*a*9 in the pixel area 10*a* via the second groove 62 as indicated by the arrow La1 in FIG. 8. Further, as indicated by the arrow Lb1 in FIG. 8, from the first groove 61, the liquid crystal 50 is ejected into the pixel area 10*a* via the third groove 63. Further, when the liquid crystal 50 in the fourth groove 64 is caused to flow by the second pump 70*b* from the first end 64*a* toward the second end 64*b* of the fourth groove 64, the liquid crystal 50 of the pixel area 10*a* is drawn into the fourth groove 64 from a region near the corner 10*a*4 and along the side 20*a*9 in the pixel area 10*a* via the second groove 62 as illustrated by the arrow La2 in FIG. 8. Further, as indicated by the arrow Lb2 in FIG. 8, from the fourth groove 64, the liquid crystal 50 is ejected into the pixel area 10*a* via the third groove 63. Accordingly, in the pixel area 10*a*, the flow of the liquid crystal 50 in one direction from the side of the side 20*a*7 toward the side of the side 20*a*9 occurs. As a result, the liquid crystal 50 ejected from the first groove 61 and the fourth groove 64 can be smoothly distributed across the pixel area 10*a*, and thus effects similar to those of exemplary embodiment 1, such as a concentration of ionic impurities in the liquid crystal 50 in the pixel area 10*a* being easily kept at a relatively low level, are achieved.

Exemplary Embodiment 5

Figure 9:
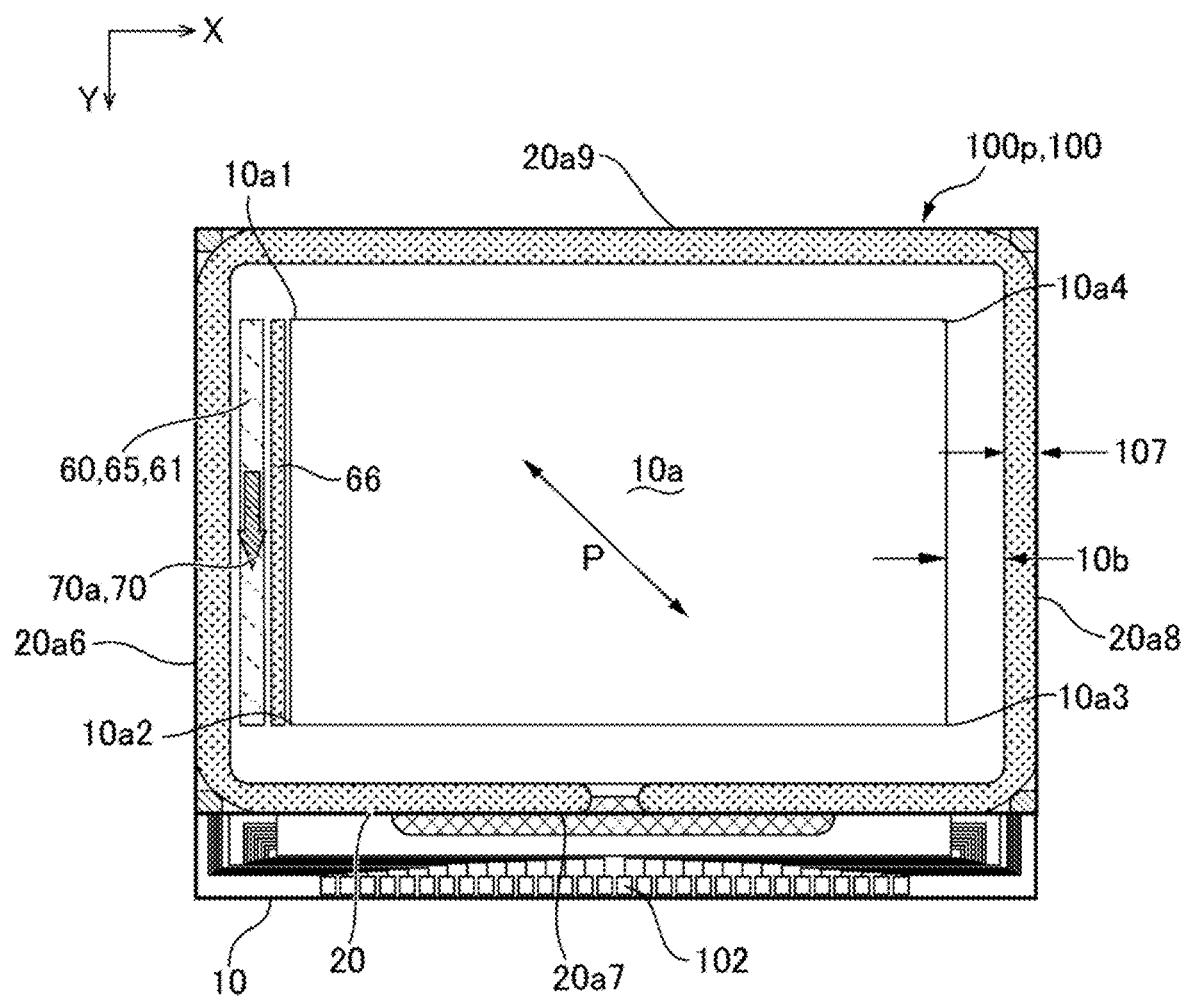
FIG. 9 is an explanatory view of the liquid crystal apparatus according to exemplary embodiment 5 of the present disclosure.

FIG. 9 is an explanatory view of the liquid crystal apparatus 100 according to exemplary embodiment 5 of the present disclosure, and schematically illustrates a planar configuration of the flow path 60 provided to the liquid crystal apparatus 100. In exemplary embodiments 1 to 4, the gap between the first substrate 10 and the second substrate 20 in the area between the first groove 61 and the pixel area 10*a* was equal to the gap between the first substrate 10 and the second substrate 20 in the pixel area 10*a*. In this exemplary embodiment, as illustrated in FIG. 9, a wall portion 66 configured to narrow the gap between the first substrate 10 and the second substrate 20 is provided between the first groove 61 and the pixel area 10*a*. In the exemplary embodiment, when the seal material 107 is provided, the wall portion 66 is simultaneously formed by the seal material. As a result, the first substrate 10 and the second substrate 20 are adhered by the wall portion 66 as well.

Accordingly, when the liquid crystal 50 in the first groove 61 is caused to flow by the first pump 70*a*, leakage of the liquid crystal 50 between the first groove 61 and the pixel area 10*a* can be suppressed, making it possible to draw the liquid crystal 50 into the first groove 61 and eject the liquid crystal 50 from the first groove 61 appropriately. Note that while, in the exemplary embodiment, the wall portion 66 is provided in exemplary embodiment 1, the wall portion 66 may be provided in exemplary embodiments 2 to 4. Further, in exemplary embodiments 3 and 4, the wall portion 66 is preferably also further provided between the fourth groove 64 and the pixel area 10*a*.

Exemplary Embodiment 6

Figure 10:
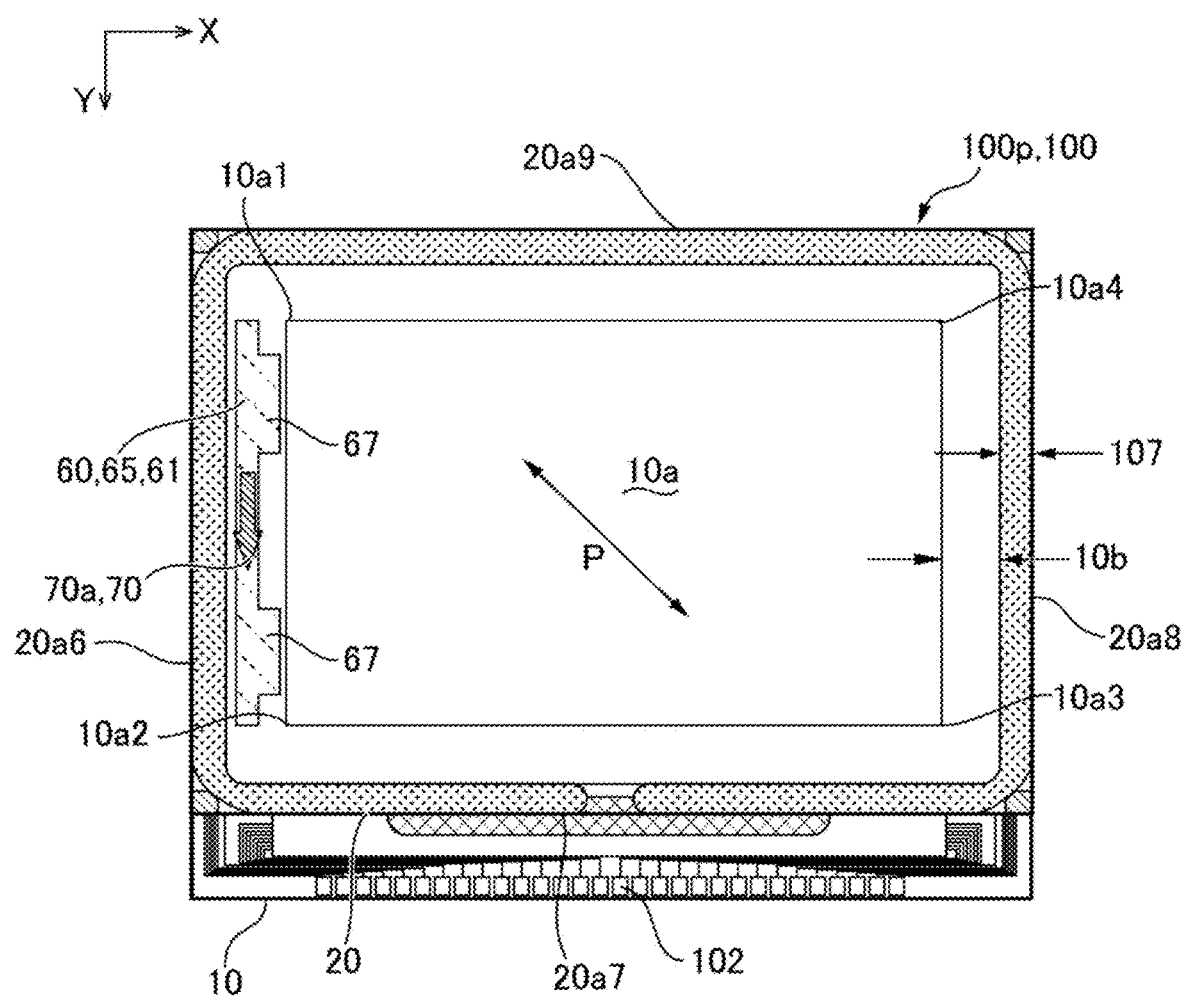
FIG. 10 is an explanatory view of the liquid crystal apparatus according to exemplary embodiment 6 of the present disclosure.

FIG. 10 is an explanatory view of the liquid crystal apparatus 100 according to exemplary embodiment 6 of the present disclosure, and schematically illustrates a planar configuration of the flow path 60 provided to the liquid crystal apparatus 100. In exemplary embodiments 1 to 4, a cross-sectional opening of the first groove 61 was the same in an extending direction of the first groove 61. However, in this exemplary embodiment, as illustrated in FIG. 10, the first groove 61 is provided with a liquid crystal storage unit 67 having a larger cross-sectional opening than that of the other portions of the first groove 61. In this case, a mode in which the first groove 61 is partially deepened to provide the liquid crystal storage unit 67, and a mode in which a width of the first groove 61 is partially widened to provide the liquid crystal storage unit 67 may be adopted. FIG. 10 illustrates a mode in which the width of the first groove 61 is widened in a plurality of locations to provide a plurality of the liquid crystal storage units 67 in the plurality of locations.

According to such a mode, the filled amount of the liquid crystal 50 can be further increased, making it possible to extend the time until the entire liquid crystal 50 deteriorates. Note that while, in this exemplary embodiment, the liquid crystal storage unit 67 is provided in exemplary embodiment 1, the liquid crystal storage unit 67 may be provided in exemplary embodiments 2 to 4. Further, in exemplary embodiments 3 and 4, the liquid crystal storage unit 67 is preferably also further provided to the fourth groove 64.

Exemplary Embodiment 7

Figure 11:
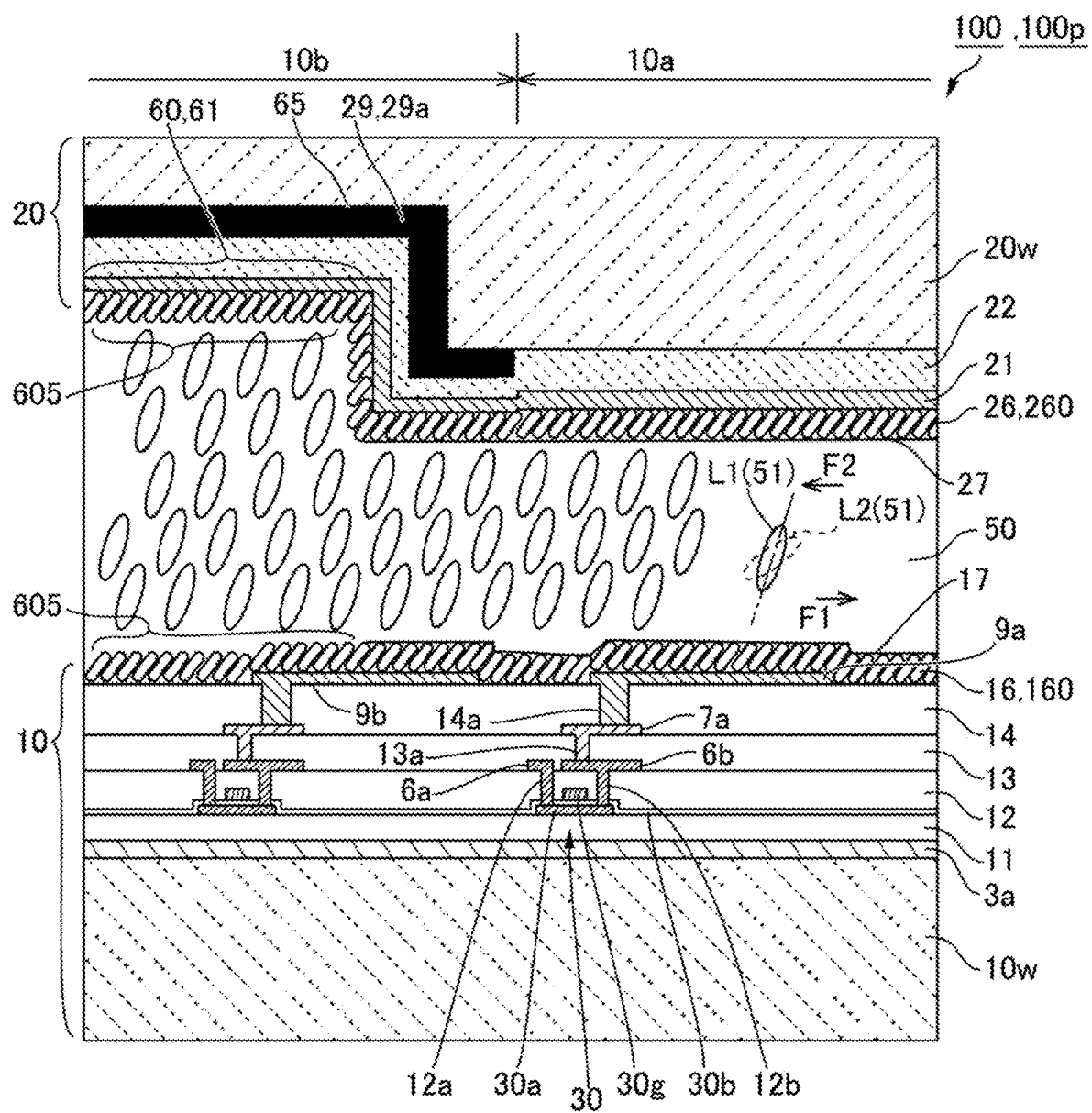
FIG. 11 is an explanatory view of the liquid crystal apparatus according to exemplary embodiment 7 of the present disclosure.

FIG. 11 is an explanatory view of the liquid crystal apparatus 100 according to exemplary embodiment 7 of the present disclosure, and illustrates a cross section of the liquid crystal apparatus 100. In this exemplary embodiment, as illustrated in FIG. 11, an ion trapping portion having a higher ion trapping capability than that of the pixel area 10a is provided in a region overlapping the first groove 61 between the first substrate 10 and the second substrate 20. In the exemplary embodiment, a hydrophobic film composed of organic silane compound layers 17, 27 is formed on the surfaces of the first alignment film 16 and the second alignment film 26 in the pixel area 10a. As a result, the silanol groups of the first alignment film 16 and the second alignment film 26 and the liquid crystal 50 are not in contact with each other. Therefore, a photochemical reaction is unlikely to occur between the silanol groups of the first alignment film 16 and the second alignment film 26 and the liquid crystal 50, and thus deterioration of the liquid crystal 50 can be suppressed. In contrast, in the region overlapping the first groove 61, either the organic silane compound layers 17, 27 are not formed or just a decomposition product of the organic silane compound layers 17, 27 is formed, resulting in higher hydrophilicity than that of the pixel area 10a. Accordingly, in the exemplary embodiment, the entire region of both the first substrate 10 and the second substrate 20 that overlaps the first groove 61 is an ion trapping portion 605 having a higher ion trapping capability than that of the pixel area 10a. Therefore, when the liquid crystal 50 passes through the flow path 60 composed of the first groove 61, the concentration of ionic impurities in the liquid crystal 50 can be reduced.

The imparting of hydrophobicity to the surface of the first alignment film 16 and the surface of the second alignment film 26 can be achieved by, for example, coupling the organic silane compound layers 17, 27 to the hydroxyl group (—OH) portion by a silane coupling agent such as an organic siloxane. The silane coupling agent used here produces silanol (Si—OH) by hydrolysis, and subsequently the silanol gradually condenses to produce siloxane bonds (Si—O—Si) and form the organic silane compound layers 17, 27. Further, the silane coupling agent produces a strong bond with the inorganic oxide surfaces of the first alignment film 16 and the second alignment film 26, and forms a self-organizing monomolecular film. Examples of the silane coupling agent include n-hexyltrimethoxysilane, n-hexyltriethoxysilane, cyclohexylmethyldimethoxysilane, n-octyltriethoxysilane, n-decyltrimethoxysilane, and the like. Furthermore, as the silane coupling agent, an agent containing a fluorine atom (F) in a hydrophobic organic functional group can be used.

Further, after the organic silane compound layers 17, 27 are formed on the entire surface of the first alignment film 16 and the entire surface of the second alignment film 26, by forming energy light such as ultraviolet light (UV) on the organic silane compound layers 17, 27 in a region overlapping the first groove 61 and decomposing the organic silane compound layers 17, 27, it is possible to provide the ion trapping portion 605 having reduced hydrophobicity in the region overlapping the first groove 61.

Note that while, in the exemplary embodiment, the ion trapping portion 605 is provided on both the first substrate 10 side and the second substrate 20 side, the ion trapping portion 605 may be provided on only one of the first substrate 10 side and the second substrate 20 side. Further, while in the exemplary embodiment the ion trapping portion 605 is provided to the flow path 60 provided in exemplary embodiment 1, the ion trapping portion 605 may be provided to the flow path 60 provided in exemplary embodiments 2 to 4.

Exemplary Embodiment 8

Figure 12:
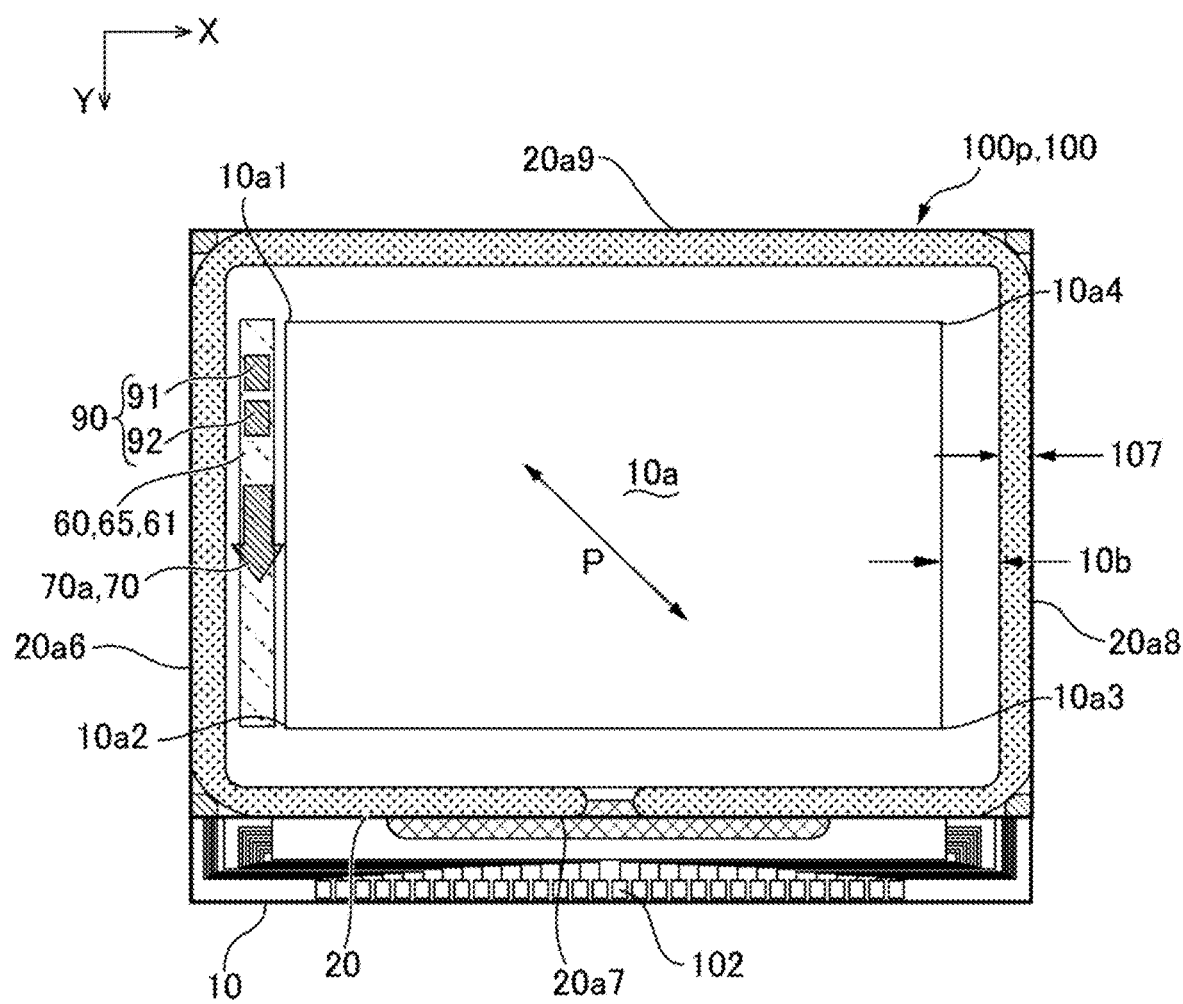
FIG. 12 is an explanatory view illustrating a planar configuration of an ion trapping portion provided to the liquid crystal apparatus according to exemplary embodiment 8 of the present disclosure.
Figure 13:
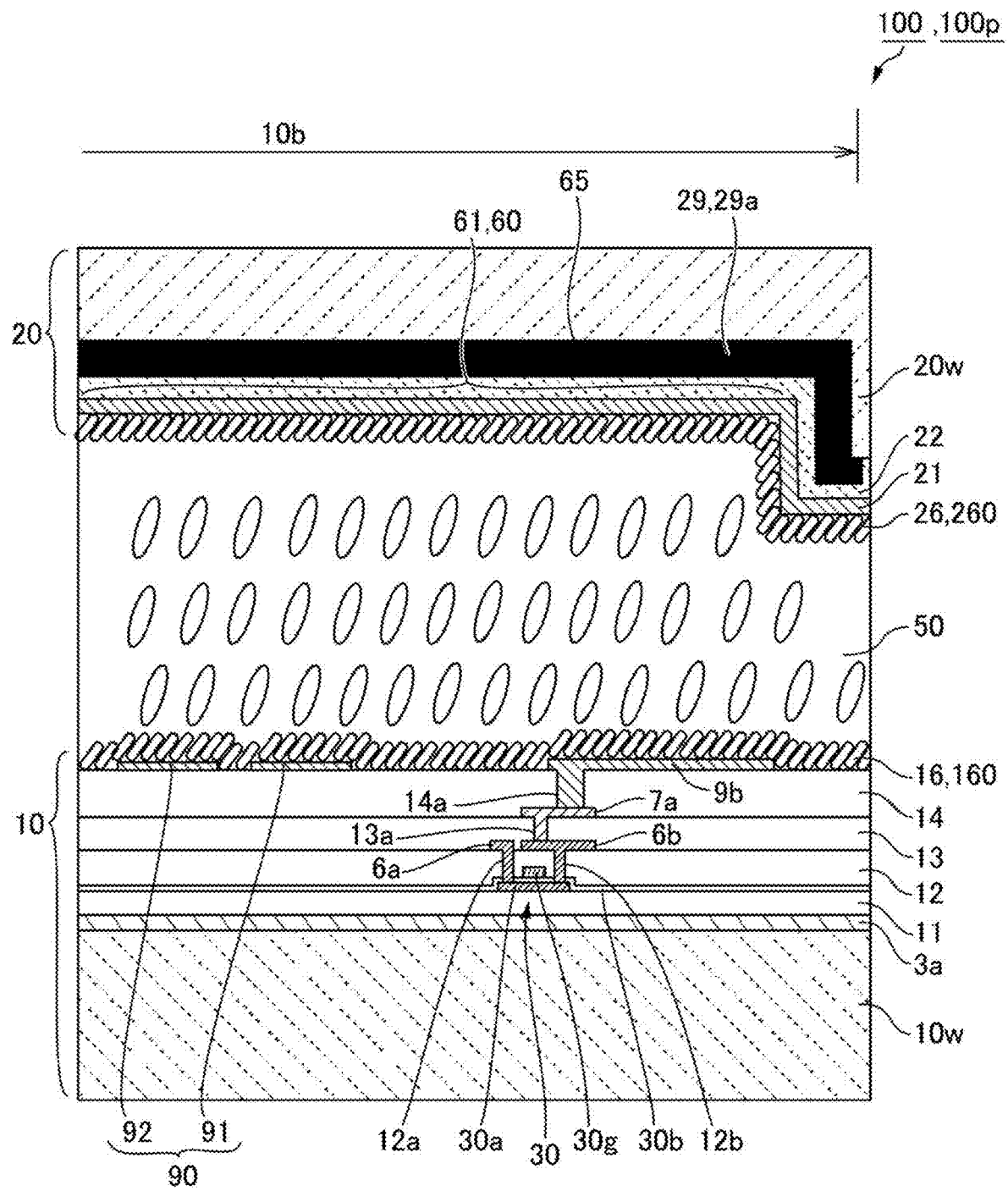
FIG. 13 is a cross-sectional view of the ion trapping portion illustrated in FIG. 12.

FIG. 12 is an explanatory view illustrating a planar configuration of an ion trapping portion 90 provided to the liquid crystal apparatus 100 according to exemplary embodiment 8 of the present disclosure. FIG. 13 is a cross-sectional view of the ion trapping portion 90 illustrated in FIG. 12. In this exemplary embodiment, as illustrated in FIG. 12 and FIG. 13, an ion trapping portion having a higher ion trapping capability than that of the pixel area 10a is provided in a region overlapping the first groove 61 between the first substrate 10 and the second substrate 20. In the exemplary embodiment, the ion trapping portion 90 is constituted by ion trap electrodes 91, 92 that electrically trap ions. In such ion trap electrodes 91, 92, a constant potential of +5 V, for example, is applied to the ion trap electrode 91, and a constant potential of −5 V, for example, is applied to the ion trap electrode 92. As a result, anionic ionic impurities contained in the liquid crystal 50 are trapped by the ion trap electrode 91, and cationic ionic impurities contained in the liquid crystal 50 are trapped by the ion trap electrode 92. Accordingly, the concentration of ionic impurities in the liquid crystal 50 can be reduced.

Note that, while in the exemplary embodiment the ion trapping portion 90 is provided to the flow path 60 provided in exemplary embodiment 1, the ion trapping portion 90 may be provided to the flow path 60 provided in exemplary embodiments 2 to 4. Further, while a direct current voltage is applied to the ion trap electrodes 91, 92, an alternating current voltage may be applied.

Exemplary Embodiment 9

Figure 14:
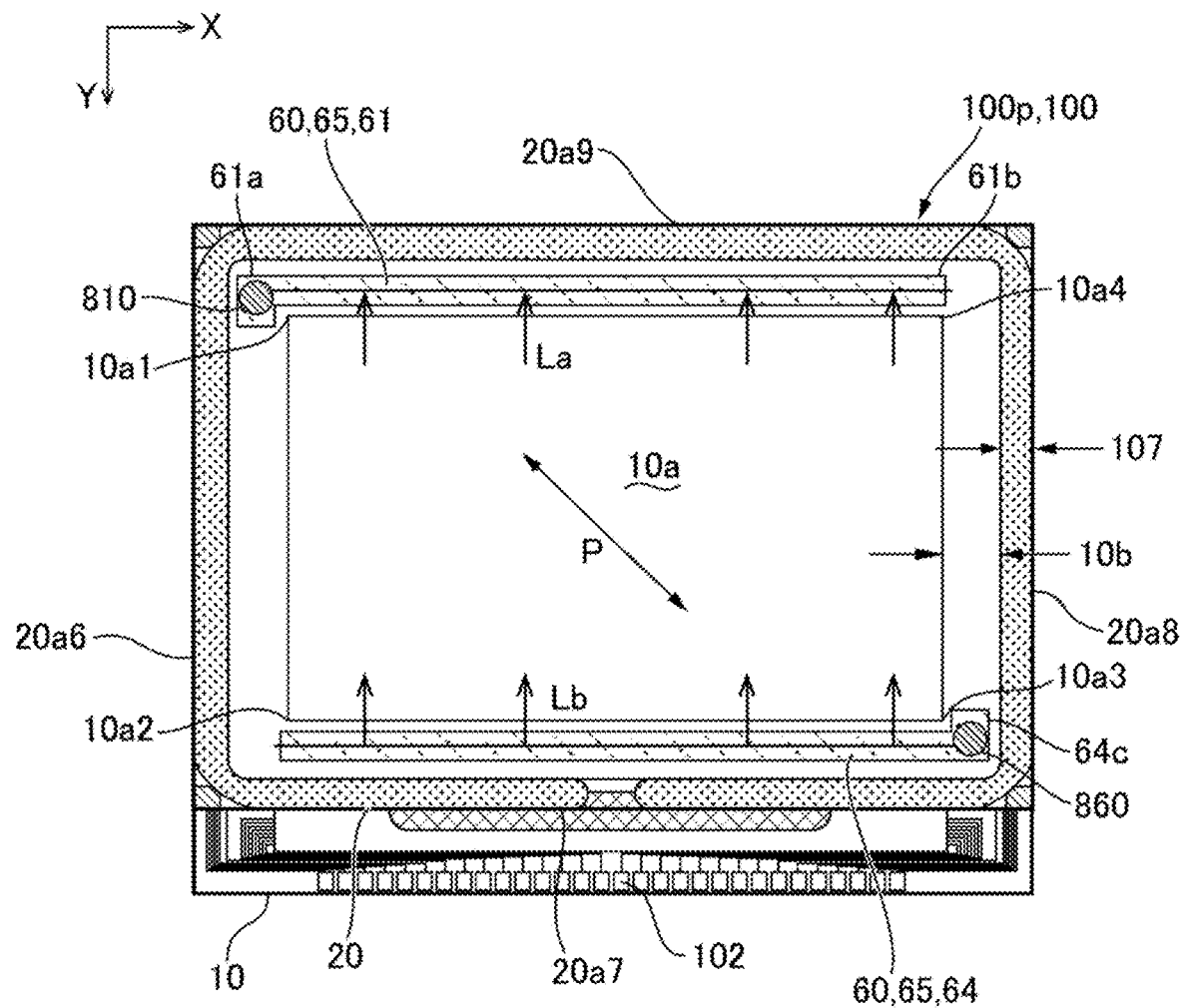
FIG. 14 is an explanatory view of the liquid crystal apparatus according to exemplary embodiment 9 of the present disclosure.
Figure 15:
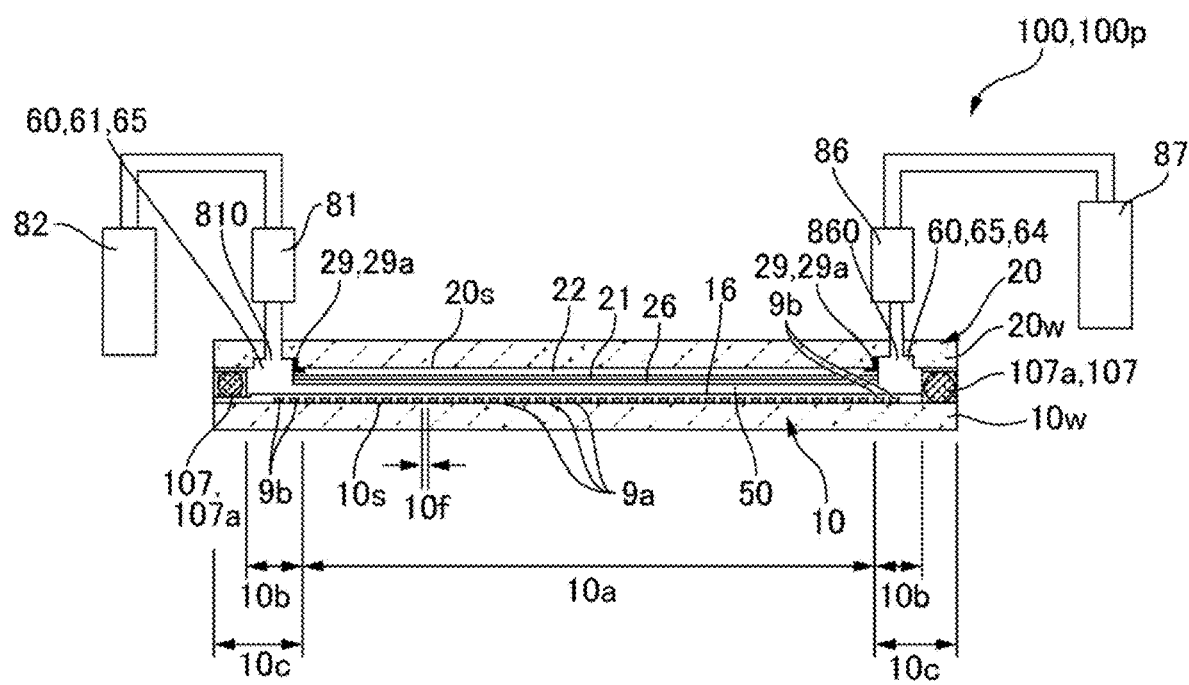
FIG. 15 is an explanatory view illustrating the pump coupled to the liquid crystal panel illustrated in FIG. 14.

FIG. 14 is an explanatory view of the liquid crystal apparatus 100 according to exemplary embodiment 9 of the present disclosure, and schematically illustrates a planar configuration of the flow path 60 provided to the liquid crystal apparatus 100. FIG. 15 is an explanatory view illustrating a pump coupled to the liquid crystal panel 100p illustrated in FIG. 14. In this exemplary embodiment, unlike exemplary embodiment 1, the relationship between the four sides 20a6, 20a7, 20a8, 20a9 and the first side, the second side, the third side, and the fourth side of the present disclosure and the like are as follows.
Side 20a6 (short side)="Third side"
Side 20a7 (long side)="Fourth side"
Side 20a8 (short side)="Second side"
Side 20a9 (long side)="First side"
Corner 10a1="First corner"
Corner 10a3="Second corner"

As illustrated in FIG. 14, in the liquid crystal apparatus 100 of the exemplary embodiment, the flow path 60 including the first groove 61 extending along the side 20a9 (first side) extending in the X direction from the side of the pixel area 10a on which the corner 10a1 (first corner) is positioned is formed between the pixel area 10a and the seal material 107. In the exemplary embodiment, the flow path 60 further includes the fourth groove 64 extending along a counter region along the side 20a7 (fourth side) facing the side 20a9 between the pixel area 10a and the seal material 107.

In the exemplary embodiment, from among a region where the first groove 61 extends and a counter region where the fourth groove 64 extends, a liquid crystal discharge port 810 is formed in a region overlapping one region, and a liquid crystal supplying port 860 is formed in a region overlapping the other region.

More specifically, the liquid crystal discharge port 810 is formed in a position overlapping the first groove 61, and the liquid crystal discharge port 810 is in communication with the first groove 61. In the exemplary embodiment, the liquid crystal discharge port 810 is formed in a position overlapping the first end 61a positioned on the side of the corner 10a1 (first corner) in the first groove 61, and the liquid crystal discharge port 810 is in communication with the first groove 61 at the first end 61a. Further, the liquid crystal supplying port 860 is formed in a position overlapping the fourth groove 64, and the liquid crystal supplying port 860 is in communication with the fourth groove 64. In the exemplary embodiment, the liquid crystal supplying port 860 is formed in a position overlapping an end portion 64c positioned on the side of the corner 10a3 (second corner) in the fourth groove 64, and the liquid crystal supplying port 860 is in communication with the fourth groove 64 at the end portion 64c. Accordingly, the liquid crystal discharge port 810 and the liquid crystal supplying port 860 are positioned in a diagonal of the pixel area 10a.

The first groove 61 and the fourth groove 64 extend along the long side of the pixel area 10a, and the first groove 61 and the fourth groove 64 are not connected. Similar to exemplary embodiment 1, the first groove 61 and the fourth groove 64 are each constituted by the groove 65 formed in the substrate main body 20w of the second substrate 20.

As illustrated in FIG. 15, the liquid crystal discharge port 810 and the liquid crystal supplying port 860 are, for example, through holes formed in the second substrate 20, and a pump is coupled to at least one of the liquid crystal discharge port 810 and the liquid crystal supplying port 860. In the exemplary embodiment, a first pump 81 for liquid crystal discharge disposed outside the first substrate 10 and the second substrate 20 is coupled to the liquid crystal discharge port 810, and the first pump 81 is coupled to a recovery container 82 of the liquid crystal 50. A second pump 86 for supplying liquid crystal is coupled to the liquid crystal supplying port 860, and the second pump 86 is coupled to a liquid crystal container 87 in which the pure liquid crystal 50 is stored.

In the liquid crystal apparatus 100 thus configured, by activating the first pump 81 and the second pump 86 after deterioration of the liquid crystal 50 has advanced, it is possible to replace the liquid crystal 50 of the liquid crystal apparatus 100 in part or in whole. At this time, the first pump 81 draws the liquid crystal 50 of the pixel area 10a from the first groove 61 as indicated by the arrow La in FIG. 14, and the second pump 86 ejects the pure liquid crystal 50 from the fourth groove 64 into the pixel area 10a as indicated by the arrow Lb in FIG. 14. Accordingly, in the pixel area 10a, the flow of the liquid crystal 50 in one direction from the side of the side 20a7 toward the side of the side 20a9 occurs. As a result, the pure liquid crystal 50 ejected from the fourth groove 64 can be smoothly distributed across the pixel area 10a, and thus effects similar to those of exemplary embodiment 1, such as a concentration of ionic impurities in the liquid crystal 50 in the pixel area 10a being easily kept at a relatively low level, are achieved.

Further, because the liquid crystal discharge port 810 is provided near the corner 10a1, the liquid crystal 50 in the region of the pixel area 10a where the ionic impurities tend to become high in concentration is drawn into the first groove 61. Accordingly, even in a case such as when the liquid crystal 50 of the liquid crystal apparatus 100 is partially replaced, the concentration of ionic impurities in the liquid crystal 50 of the pixel area 10a is easily kept at a relatively low level.

Exemplary Embodiment 10

Figure 16:
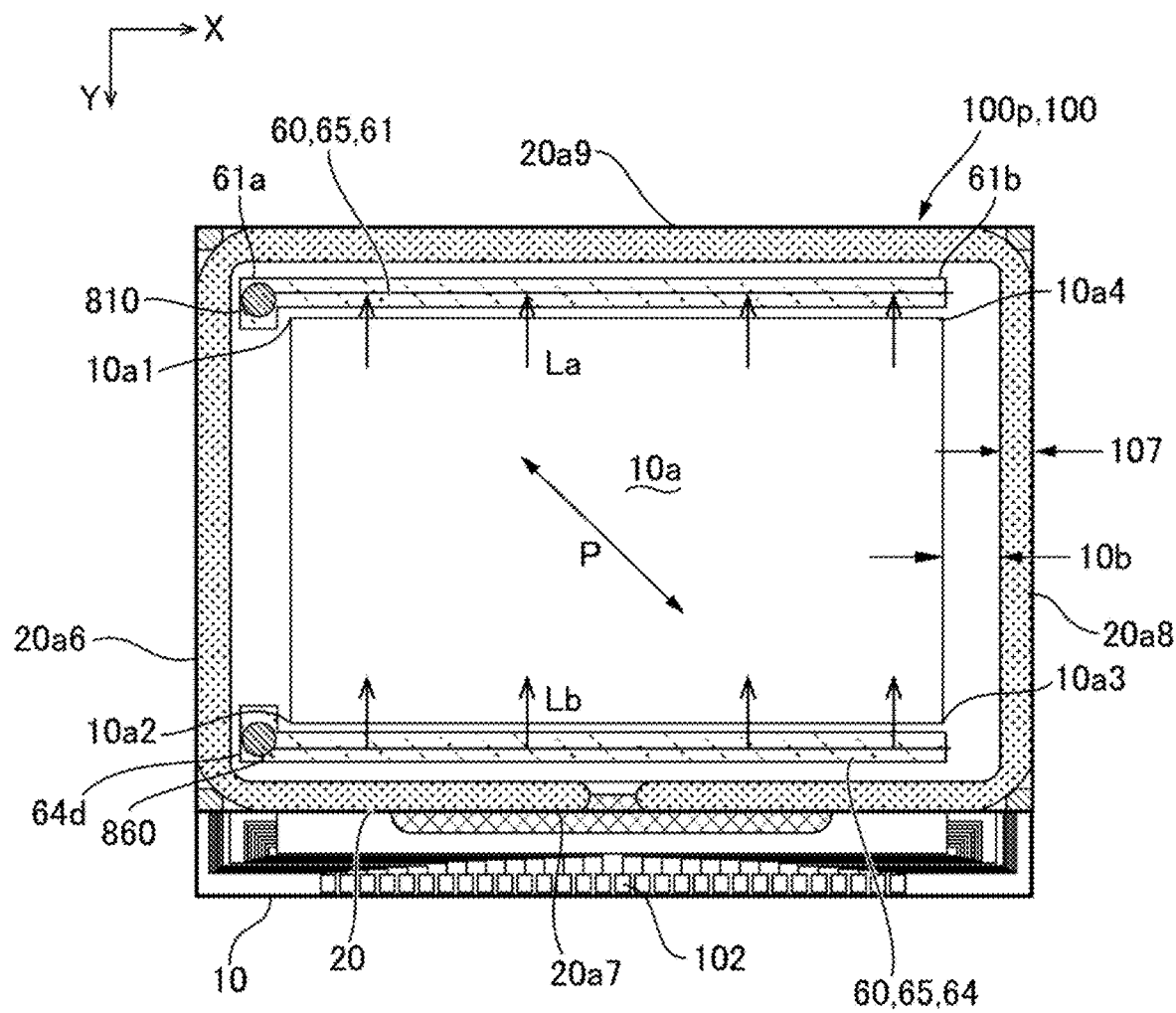
FIG. 16 is an explanatory view of the liquid crystal apparatus according to exemplary embodiment 10 of the present disclosure.

FIG. 16 is an explanatory view of the liquid crystal apparatus 100 according to exemplary embodiment 10 of the present disclosure, and schematically illustrates a planar configuration of the flow path 60 provided to the liquid crystal apparatus 100. In this exemplary embodiment, similar to exemplary embodiment 9, the relationship between the four sides 20a6, 20a7, 20a8, 20a9 and the first side, the second side, the third side, and the fourth side of the present disclosure and the like are as follows.
Side 20a6 (short side)="Third side"
Side 20a7 (long side)="Fourth side"
Side 20a8 (short side)="Second side"
Side 20a9 (long side)="First side"
Corner 10a1="First corner"
Corner 10a3="Second corner"

As illustrated in FIG. 16, in this exemplary embodiment as well, similar to exemplary embodiment 9, the flow path 60 including the first groove 61 extending along the side 20a9 (first side) extending in the X direction from the side of the pixel area 10a on which the corner 10a1 (first corner) is positioned is formed between the pixel area 10a and the seal material 107. Further, the flow path 60 further includes the fourth groove 64 extending along the counter region along the side 20a7 (fourth side) facing the side 20a9 between the pixel area 10a and the seal material 107. Further, the liquid crystal discharge port 810 is formed in a position overlapping the first end 61a positioned on the side of the corner 10a1 (first corner) in the first groove 61, and the liquid crystal discharge port 810 is in communication with the first groove 61 at the first end 61a.

In the exemplary embodiment, the liquid crystal supplying port 860 is formed in a position overlapping an end portion 64d positioned on the side opposite to the corner 10a3 (second corner) in the fourth groove 64, and the liquid crystal supplying port 860 is in communication with the fourth groove 64 at the end portion 64d. Accordingly, the liquid crystal discharge port 810 and the liquid crystal supplying port 860 are positioned on the same side (side of the side 20a6) in the X direction.

In this exemplary embodiment as well, similar to exemplary embodiment 9 described with reference to FIG. 15, the first pump 81 for liquid crystal discharge disposed outside the first substrate 10 and the second substrate 20 is coupled to the liquid crystal discharge port 810, and the second pump 86 for liquid crystal supply is coupled to the liquid crystal supplying port 860. Accordingly, similar to exemplary embodiment 9, by activating the first pump 81 and the second pump 86, it is possible to replace the liquid crystal 50 of the liquid crystal apparatus 100 in part or in whole. At this time, the first pump 81 draws the liquid crystal 50 of the pixel area 10a from the first groove 61 as indicated by the arrow La in FIG. 16, and the second pump 86 ejects the pure liquid crystal 50 from the fourth groove 64 into the pixel area 10a as indicated by the arrow Lb in FIG. 16. Accordingly, in the pixel area 10a, the flow of the liquid crystal 50 in one direction from the side of the side 20a7 toward the side of the side 20a9 occurs. As a result, by exemplary embodiment 10, the pure liquid crystal 50 ejected from the fourth groove 64 can be smoothly distributed across the pixel area 10a, and thus effects similar to those of exemplary embodiment 9, such as a concentration of ionic impurities in the liquid crystal 50 in the pixel area 10a being easily kept at a relatively low level, are achieved.

Further, because the liquid crystal discharge port 810 is provided near the corner 10a1, the liquid crystal 50 in the region of the pixel area 10a where the ionic impurities tend to become high in concentration is drawn into the first groove 61. Accordingly, even in a case such as when the liquid crystal 50 of the liquid crystal apparatus 100 is partially replaced, the concentration of ionic impurities in the liquid crystal 50 of the pixel area 10a is easily kept at a relatively low level.

Exemplary Embodiment 11

Figure 17:
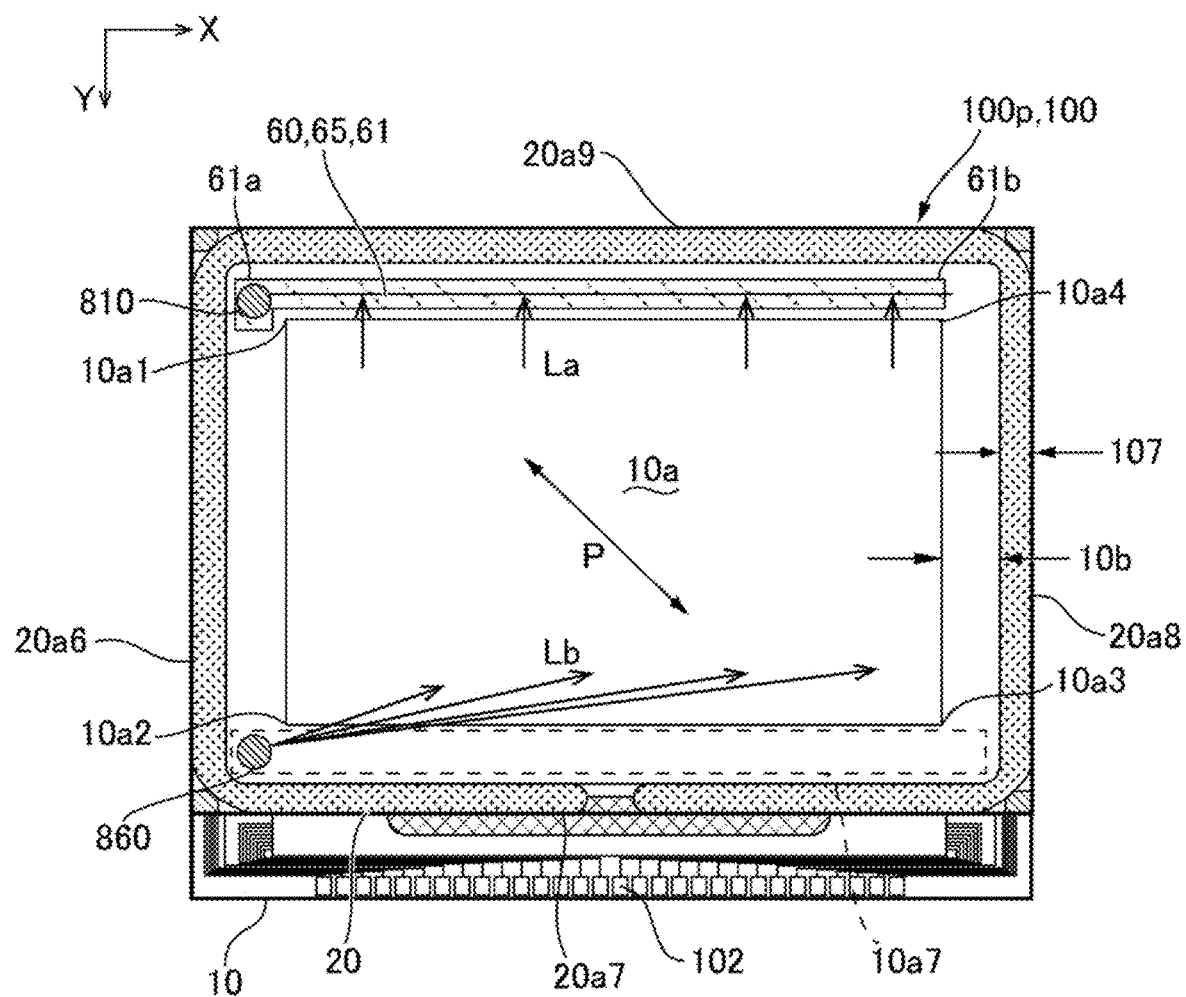
FIG. 17 is an explanatory view of the liquid crystal apparatus according to exemplary embodiment 11 of the present disclosure.

FIG. 17 is an explanatory view of the liquid crystal apparatus 100 according to exemplary embodiment 11 of the present disclosure, and schematically illustrates a planar configuration of the flow path 60 provided to the liquid crystal apparatus 100. In this exemplary embodiment, similar to exemplary embodiment 9, the relationship between the four sides 20a6, 20a7, 20a8, 20a9 and the first side, the second side, the third side, and the fourth side of the present disclosure and the like are as follows.
Side 20a6 (short side)="Third side"
Side 20a7 (long side)="Fourth side"
Side 20a8 (short side)="Second side"
Side 20a9 (long side)="First side"
Corner 10a1="First corner"
Corner 10a3="Second corner"

As illustrated in FIG. 17, in this exemplary embodiment as well, similar to exemplary embodiment 9, the flow path 60 including the first groove 61 extending along the side 20a9 (first side) extending in the X direction from the side of the pixel area 10a on which the corner 10a1 (first corner) is positioned is formed between the pixel area 10a and the seal material 107. In the exemplary embodiment, from among the region where the first groove 61 extends and a counter region 10a7 along the side 20a7 (fourth side) facing the side 20a9 between the pixel area 10a and the seal material 107a, the liquid crystal discharge port 810 is formed in a region overlapping one region, and the liquid crystal supply port 860 is formed in a region overlapping the other region.

More specifically, the liquid crystal discharge port 810 is formed in a position overlapping the first end 61a positioned on the side of the corner 10a1 (first corner) in the first groove 61, and the liquid crystal discharge port 810 is in communication with the first groove 61 at the first end 61a. Further, while a fourth groove is not formed in the counter region 10a7 along the side 20a7 (fourth side), the liquid crystal supplying port 860 is formed in a position overlapping an end portion positioned on the side (side of the corner 10a2) opposite to the corner 10a3 (second corner) in the counter region 10a7. Accordingly, the liquid crystal discharge port 810 and the liquid crystal supplying port 860 are positioned on the same side (side of the side 20a6) in the X direction.

In this exemplary embodiment as well, similar to exemplary embodiment 9 described with reference to FIG. 15, the first pump 81 for liquid crystal discharge disposed outside the first substrate 10 and the second substrate 20 is coupled to the liquid crystal discharge port 810, and the second pump 86 for liquid crystal supply is coupled to the liquid crystal supplying port 860. Accordingly, similar to exemplary embodiment 9, by activating the first pump 81 and the second pump 86, it is possible to replace the liquid crystal 50 of the liquid crystal apparatus 100 in part or in whole. At this time, the first pump 81 draws the liquid crystal 50 of the pixel area 10a from the first groove 61 as indicated by the arrow La in FIG. 17, and the second pump 86 ejects the pure liquid crystal 50 from a portion positioned on the side of the side 20a7 as indicated by the arrow Lb in FIG. 17. Accordingly, in the pixel area 10a, the flow of the liquid crystal 50 in one direction from the side of the side 20a7 toward the side of the side 20a9 occurs. As a result, the liquid crystal 50 ejected from the first groove 61 can be smoothly distributed across the pixel area 10a, and thus effects similar to those of exemplary embodiments 9 and 10, such as a concentration of ionic impurities in the liquid crystal 50 in the pixel area 10a being easily kept at a relatively low level, are achieved.

Further, because the liquid crystal discharge port 810 is provided near the corner 10a1, the liquid crystal 50 in the region of the pixel area 10a where the ionic impurities tend to become high in concentration is drawn into the first groove 61. Accordingly, even in a case such as when the liquid crystal 50 of the liquid crystal apparatus 100 is partially replaced, the concentration of ionic impurities in the liquid crystal 50 of the pixel area 10a is easily kept at a relatively low level.

Exemplary Embodiment 12

Figure 18:
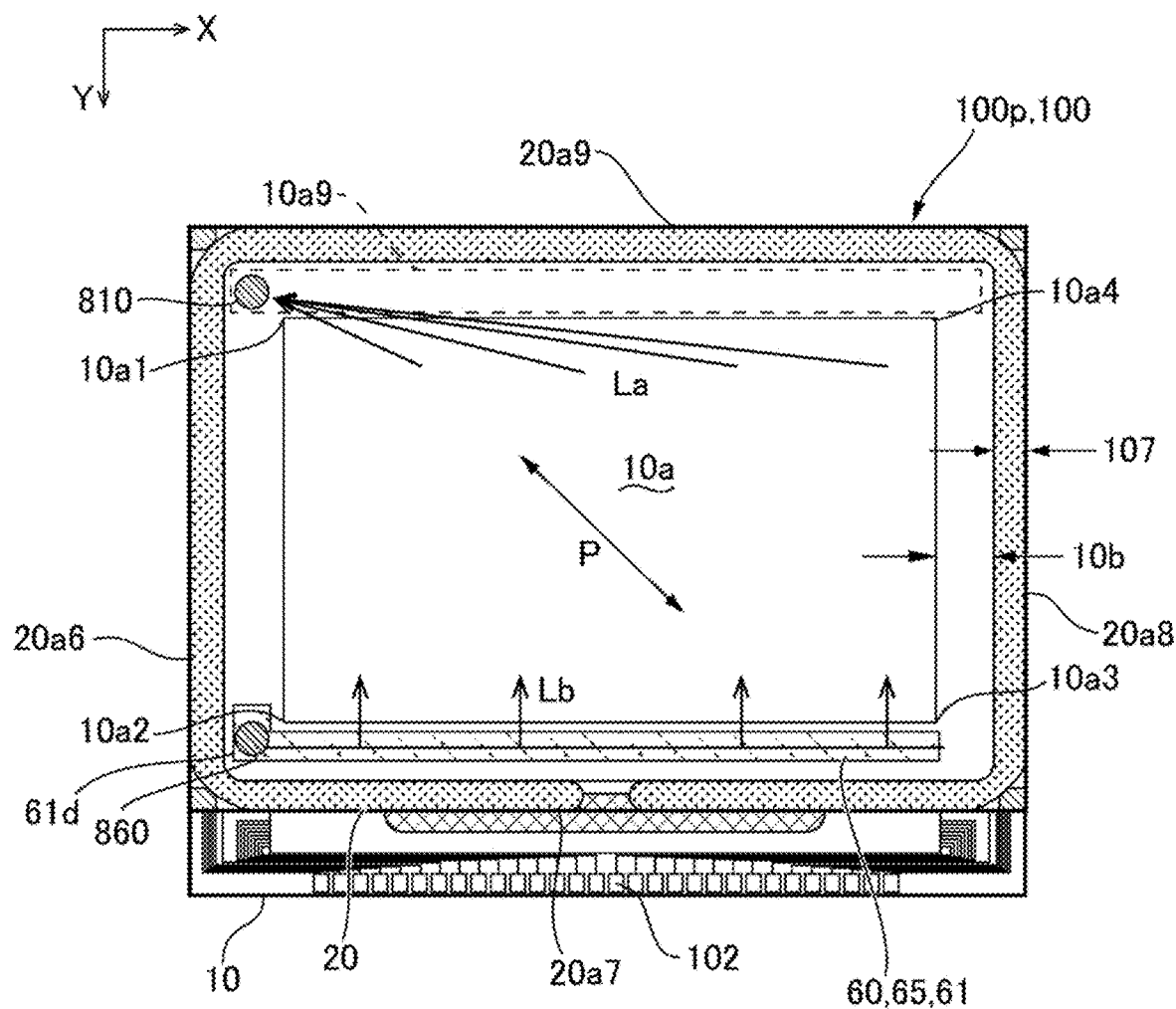
FIG. 18 is an explanatory view of the liquid crystal apparatus according to exemplary embodiment 12 of the present disclosure.

FIG. 18 is an explanatory view of the liquid crystal apparatus 100 according to exemplary embodiment 12 of the present disclosure, and schematically illustrates a planar configuration of the flow path 60 provided to the liquid crystal apparatus 100. In this exemplary embodiment, unlike exemplary embodiments 9 to 11, the relationship between the four sides 20a6, 20a7, 20a8, 20a9 and the first side, the second side, the third side, and the fourth side of the present disclosure and the like are as follows.
Side 20a6 (short side)="Third side"
Side 20a7 (long side)="First side"
Side 20a8 (short side)="Second side"
Side 20a9 (long side)="Fourth side"
Corner 10a1="First corner"
Corner 10a3="Second corner"

As illustrated in FIG. 18, in the exemplary embodiment, the flow path 60 including the first groove 61 extending along the side 20a7 (first side) is formed between the pixel area 10a and the seal material 107. In the exemplary embodiment, from among the region where the first groove 61 extends and the counter region 10a9 extending along the side 20a9 between the pixel area 10a and the seal material 107, the liquid crystal discharge port 810 is formed in a region overlapping one region and the liquid crystal supplying port 860 is formed in a region overlapping the other region.

More specifically, the liquid crystal supplying port 860 is formed in a position overlapping the end portion 64d positioned on the side (side of the corner 10a2) opposite to the corner 10a3 (second corner) in the first groove 61, and the liquid crystal supplying port 860 is in communication with the first groove 61 at an end portion 61d. Further, while a fourth groove is not formed in the counter region 10a9, the liquid crystal discharge port 810 is formed in a position overlapping an end portion positioned on the side of the corner 10a1 (first corner) in the counter region 10a9. Accordingly, the liquid crystal discharge port 810 and the liquid crystal supplying port 860 are positioned on the same side (side of the side 20a6) in the X direction.

In this exemplary embodiment as well, similar to exemplary embodiment 9 described with reference to FIG. 15, the first pump 81 for liquid crystal discharge disposed outside the first substrate 10 and the second substrate 20 is coupled to the liquid crystal discharge port 810, and the second pump 86 for liquid crystal supply is coupled to the liquid crystal supplying port 860. Accordingly, similar to exemplary embodiment 9, by activating the first pump 81 and the second pump 86, it is possible to replace the liquid crystal 50 of the liquid crystal apparatus 100 in part or in whole. At this time, the first pump 81 draws the liquid crystal 50 of the pixel area 10a from a region positioned on the side of the side 20a9 as indicated by the arrow La in FIG. 18, and the second pump 86 ejects the pure liquid crystal 50 from the first groove 61 into the pixel area 10a as indicated by the arrow Lb in FIG. 18. Accordingly, in the pixel area 10a, the flow of the liquid crystal 50 in one direction from the side of the side 20a7 toward the side of the side 20a9 occurs. As a result, the pure liquid crystal 50 ejected from the first groove 61 can be smoothly distributed across the pixel area 10a, and thus effects similar to those of exemplary embodiments 9, 10, and 11, such as a concentration of ionic impurities in the liquid crystal 50 in the pixel area 10a being easily kept at a relatively low level, are achieved.

Further, because the liquid crystal discharge port 810 is provided near the corner 10a1, the liquid crystal 50 in the region of the pixel area 10a where the ionic impurities tend to become high in concentration is drawn into the liquid crystal discharge port 810. Accordingly, even in a case such as when the liquid crystal 50 of the liquid crystal apparatus 100 is partially replaced, the concentration of ionic impurities in the liquid crystal 50 of the pixel area 10a is easily kept at a relatively low level.

Other Exemplary Embodiments

In exemplary embodiments 9 to 12, the first pump 81 is coupled to the liquid crystal discharge port 810, and the second pump 86 is coupled to the liquid crystal supplying port 860. However, a mode in which a pump is coupled to the liquid crystal discharge port 810 and the liquid crystal container 87 is coupled to the liquid crystal supplying port 860 without a pump interposed therebetween, or a mode in which a pump is coupled to the liquid crystal supplying port 860 and the recovery container 82 is coupled to the liquid crystal discharge port 810 without a pump interposed therebetween may be adopted.

Although the present disclosure is applied to the transmissive type liquid crystal apparatus 100 in the exemplary embodiments described above, the present disclosure may also be applied to a reflective type liquid crystal apparatus.

Installation Example to Electronic Device

Figure 19:
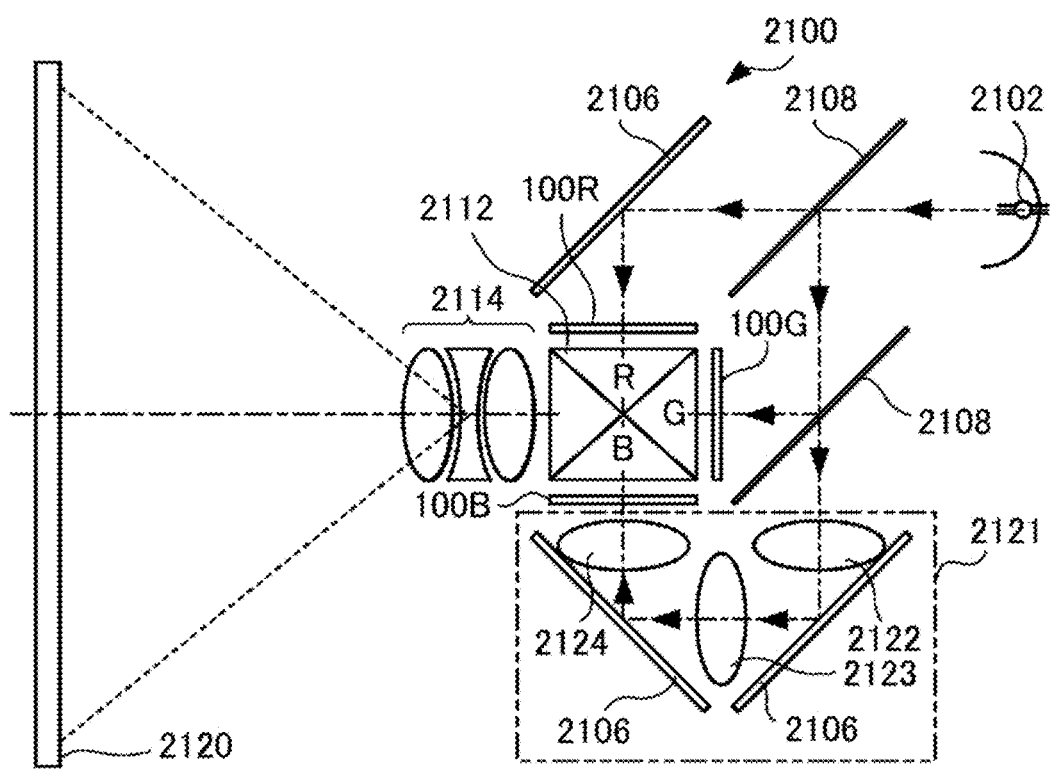
FIG. 19 is an explanatory view of a projection-type display apparatus (electronic device) employing the liquid crystal apparatus to which the present disclosure is applied.

An electronic device employing the liquid crystal apparatus 100 according to the above-described exemplary embodiments will be described below. FIG. 19 is a schematic block diagram of a projection-type display apparatus employing the liquid crystal apparatus 100 to which the present disclosure is applied. An illustration of an optical element such as a polarizing plate is omitted in FIG. 19. A projection-type display apparatus 2100 illustrated in FIG. 19 is an example of an electronic device employing the liquid crystal apparatus 100.

In the projection-type display apparatus 2100 illustrated in FIG. 19, the liquid crystal apparatus 100 according to the above-described exemplary embodiments is used as a light valve and can conduct high-definition and bright display without making the apparatus large. As illustrated in FIG. 19, the projection-type display apparatus 2100 is provided with a lamp unit 2102 (light source unit) with a white light source such as a halogen lamp. Projection light emitted from the lamp unit 2102 is split into three primary colors of red (R), green (G), and blue (B) by three mirrors 2106 and two dichroic mirrors 2108 installed inside. The split projection light is guided to light valves 100R, 100G, 100B corresponding to the primary colors, respectively, and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, 100B is incident on a dichroic prism 2112 from three directions. Then, at the dichroic prism 2112, the light of the R color and the light of the B color are reflected at 90 degrees, and the light of the G color is transmitted. Accordingly, an image of the primary colors is synthesized, and subsequently a color image is projected on a screen 2120 by a projection lens group 2114 (projection optical system).

Other Projection-Type Display Apparatuses

Note that the projection-type display apparatus may include a configuration in which an LED light source or the like configured to emit light of each color is used as a light source unit and the light of each color emitted from the LED light source is supplied to another liquid crystal apparatus.

Other Electronic Devices

The electronic device including the liquid crystal apparatus 100 to which the present disclosure is applied is not limited to the projection-type display apparatus 2100 of the above-described exemplary embodiment. Examples of the electronic device may include a projection-type head up display (HUD), a direct-view-type head mounted display (HMD), a personal computer, a digital still camera, and a liquid crystal television.

What is claimed is:
1. A liquid crystal apparatus comprising:
a pair of substrates;
a seal material provided between the pair of substrates;
a liquid crystal containing liquid crystal molecules that have negative dielectric anisotropy and are aligned in a diagonal direction in a pixel area on an inner side of the seal material;
a first groove extending between the pixel area and the seal material and along a first side of one of the pair of substrates;

a second groove extending between the pixel area and the seal material and along a second side adjacent to the first side of the one of the substrates, the second groove being connected to the first groove;

a third groove extending between the pixel area and the seal material and along a third side facing the second side of the one of the substrates, the third groove being connected to the first groove; and a first pump configured to draw the liquid crystal from one end side of the first groove and cause the liquid crystal to flow toward another end side of the first groove, wherein grooves between the pixel area and the seal material are only the first groove, the second groove and the third groove, and the liquid crystal flows from the pixel area to the second groove in a direction intersecting an extending direction of the second groove, and flows from the third groove to the pixel area in a direction intersecting an extending direction of the third groove.

2. The liquid crystal apparatus according to claim 1, wherein the first pump is provided to overlap the first groove between the pair of substrates.

3. The liquid crystal apparatus according to claim 1, wherein the pixel area has a rectangular shape, and the first side is a short side of the pixel area.

4. The liquid crystal apparatus according to claim 1, comprising a wall portion provided between the first groove and the pixel area and configured to narrow a gap between the pair of substrates.

5. The liquid crystal apparatus according to claim 1, wherein the first groove includes a liquid crystal storage unit having a cross-sectional opening larger than that of another portion of the first groove.

6. The liquid crystal apparatus according to claim 1, comprising an ion trapping portion having a higher ion trapping capability than that of the pixel area and provided in a region overlapping the first groove between the pair of substrates.

7. The liquid crystal apparatus according to claim 6, wherein the ion trapping portion is a region having a higher hydrophilicity than that of the pixel area.

8. The liquid crystal apparatus according to claim 6, wherein the ion trapping portion is an ion trap electrode configured to electrically trap ions.

9. An electronic device comprising the liquid crystal apparatus described in claim 1.

\* \* \* \* \*